(12) United States Patent
Gentry

(10) Patent No.: US 8,433,065 B2
(45) Date of Patent: Apr. 30, 2013

(54) ENCRYPTION AND SIGNATURE SCHEMES USING MESSAGE MAPPINGS TO REDUCE THE MESSAGE SIZE

(75) Inventor: Craig B. Gentry, Mountain View, CA (US)

(73) Assignee: NTT DoCoMo Inc., Tokyo (JP)

( * ) Notice: Subject to any disclaimer, the term of this patent is extended or adjusted under 35 U.S.C. 154(b) by 970 days.

(21) Appl. No.: 12/492,913

(22) Filed: Jun. 26, 2009

(65) Prior Publication Data

US 2010/0008496 A1 Jan. 14, 2010

Related U.S. Application Data

(62) Division of application No. 10/543,464, filed as application No. PCT/US2004/036053 on Oct. 29, 2004, now Pat. No. 7,957, 525.

(60) Provisional application No. 60/515,982, filed on Oct. 31, 2003.

(51) Int. Cl.
*H04K 1/00* (2006.01)

(52) U.S. Cl.
USPC .............. 380/30; 380/282; 713/176; 713/180

(58) Field of Classification Search ........................ None
See application file for complete search history.

(56) References Cited

U.S. PATENT DOCUMENTS

| | | | |
|---|---|---|---|
| 5,708,432 A | 1/1998 | Reynolds et al. | |
| 2002/0046339 A1* | 4/2002 | Bellare et al. ................. | 713/170 |
| 2002/0188850 A1 | 12/2002 | Naccache et al. | |

OTHER PUBLICATIONS

Vallee "Generation of Elements with Small Modular Squares and Provably Fast Integer Factoring Algorithm", Mathematics of Computation, Apr. 1991, pp. 823-829.*
Ferrer et al. "A Privacy Homomorphism Allowing Field Operation on Encrypted Data", CICYT, pp. 1-3, 2002.
Office Action dated May 17, 2010 for U.S. Appl. No. 10/543,464, 18 pages.
Office Action in JP Pat App No. 2006-538330 dated Dec. 3, 2010, 6 pages.
English Language Translation of Office Action in JP Pat App No. 2006-538330 dated Dec. 3, 2010, 8 pages.
Kenneth C. Barr and Krste Asanovic, "Energy Aware Lossless Data Compression", Proceedings of MobiSys 2003: The First International Conference on Mobile Systems, Applications, and Services, USA, The USENIX Association, [online], May 5, 2003, vol. 24, No. 3, p. 231-244.

(Continued)

*Primary Examiner* — Shewaye Gelagay
(74) *Attorney, Agent, or Firm* — Haynes and Boone, LLP

(57) ABSTRACT

According to some embodiments of the invention, a message is processed before encryption so that the encryption method generates a short ciphertext. The message processing can be viewed as a mapping (610) that maps the message into another message that generates the short ciphertext. The mapping is reversible at least if the (possibly encoded) message (H(M)) is in a restricted set, e.g. a set [0,h"] of short messages. In some embodiments of the present invention, short signatures are provided by mapping the signature into a short signature. The mapping (810) is reversible at least if the original message (H(M)) used to generate the signature is short. Signcryption, aggregate signature, and ring signature outputs are also shortened.

42 Claims, 10 Drawing Sheets

OTHER PUBLICATIONS

Brigitte Vallee, "Generation of Elements With Small Modular Squares and Provably Fast Integer Factoring Algorithms", Mathematics of Computation, USA, American Mathematical Society, [online], Apr. 1991, vol. 56, No. 194, p. 823-849.

Zheng, Y. "Shortened Digital Signatures, Signcryption and Compact and Unforgeable Key Agreement Schemes," Monash Univserity; pp. 6-15 and 45-51, Jul. 9, 1998.

Rivest et al. "A Method for Obtaining Digitial Signatures and Public-Key Crytosystems" (Communications of the ACM, v21 n2, p. 120-126, 1978).

R.L. Rivest; A Shamir and Y. Tauman, "How to Leak a Secret" (Proc. of Asiacrypt 2001, pp. 552-565).

H. Krawczyk et al., "HMAC: Keyed-Hashing for Message Authentication" Feb. 1997.

M. Bellare, D. Pointchevel; and P. Rogaway "Authenticated Key Exchange Secure Against Dictionary Attacks," Proc. of Eurocrypt 2000, B. Preneel (Ed.), Lecture Notes in Computer Science 1807, pp. 139-155.

Coron, J. "Security Proof for Partial-Domain Hash Signature Schemes" M. Yung, Ed., Advances in Cryptology—CRYPTO 2002, vol. 2442 of Lecture Notes in Computer Science, pp. 613-626, 2002.

B. Vallee, "Provably Fast Integer Factoring with Quasi-Uniform Small Quadratic Residues" (Proc. of STOC 1989, pp. 98-106).

Craig B. Gentry, "How to compress Rabin Ciphertexts and Signatures (and More)" Proc. of Crypto 2004, M. Franklin (Ed.), Lecture Notes in Computer Science 3152, pp. 179-200.

\* cited by examiner $I(a_i, b_i)$:

$J(a_i, b_i)$:

$J(a_f, b_f)$:

ENCRYPTION AND SIGNATURE SCHEMES USING MESSAGE MAPPINGS TO REDUCE THE MESSAGE SIZE

CROSS-REFERENCE TO RELATED APPLICATIONS

The present application is a divisional of U.S. patent application Ser. No. 10/543,464, filed Jul. 27, 2005 (now U.S. Pat. No. 7,957,525 issued Jun. 7, 2011), which patent application is a 35 U.S.C. 371 national stage application of PCT/US2004/036053, filed Oct. 29, 2004, which claims priority of U.S. Provisional Application No. 60/515,982 filed on Oct. 31, 2003. The PCT application and the patent application Ser. No. 10/543,464 are incorporated herein by reference.

FIELD OF THE INVENTION

The present invention relates to cryptography and secure communications, including secure communications over computer networks. The invention can be used to reduce the size of encrypted messages, signatures, and other cryptographic information.

BACKGROUND OF THE INVENTION

Cryptographic pieces of information such as encrypted messages ("ciphertext") and signatures are transmitted to recipients over a network or by mail on an electronic storage media. To make the encryption secure, a ciphertext can be considerably longer than the corresponding unencrypted "plaintext". Likewise, a signature can be considerably longer than the message from which the signature is generated. Therefore, it is desirable to reduce the ciphertext and signature size ("bandwidth"), preferably without compromising the security.

FIGS. 1-5 illustrate ciphertext and signature generation and transfer between computer systems 110 (FIG. 1) interconnected by a network 120. FIG. 2 is a flowchart of an encryption process performed by a system 110 on a "plaintext" message M to obtain a ciphertext c. Before the encryption proper, the message M is encoded into a value H(M) (step 210). The encoding may add some padding and/or random bits to the message M in order to make it possible to obtain different encoded messages H(M), and hence different ciphertexts c, for the same message M in different encryption operations. This will make it harder for an attacker to guess ("invert") the decryption method if the attacker intercepts different ciphertexts obtained with the same encryption method.

The encoded message H(M) is encrypted at step 220 to obtain the ciphertext c. The ciphertext is transmitted at step 230 over network 120 to another system 110.

The decryption process (FIG. 3) is the reverse of the encryption. The ciphertext c is received by the recipient system 110 (step 304) and decrypted to recover the encoded message H(M) (step 310). The encoded message is decoded (step 320) to recover the original message M.

In FIG. 2, the encoding step 210 and the encryption 220 are shown as separate steps because the encoding method 210 and the decoding 320 (FIG. 3) are sometimes made public while the decryption 310 and possibly the encryption 220 rely on secret information (e.g. a secret key). It is also appropriate to use the term "encryption" to denote the combination of steps 210, 220, and to use the term "decryption" for the combination of steps 310, 320, and/or to state that the encoding step 210 and decoding 320 are omitted.

FIG. 4 illustrates signature generation performed by a system 110. A message M is encoded into H(M) at step 410, and the encoded message is processed ("signed") to obtain a signature s(M) at step 420. The signature s(M) is transmitted to a recipient system 110 over network 120 (step 430). The recipient system 110 verifies the signature as shown in FIG. 5. The signature is received at step 504 and processed at step 510 to recover the encoded message H(M). The encoded message is decoded (step 520) to obtain the original message M and a test is applied to verify that the message M is indeed the message that was signed. For example, the original message can be provided to the recipient system 110 in a separate transmission for comparison with the message recovered at step 520. In some embodiments, the message is not decoded; the verification can be performed without message recovery.

In FIGS. 4 and 5, the encoding step 410 and the decoding step 520 are shown as separate operations, but it is also appropriate to use the term "signing" for the combination of steps 410, 420, and to use the term "verification" for the combination of steps 510, 520, and/or to state that the encoding step 410 and the decoding part of step 520 are omitted.

In a public-key encryption scheme, the keyholder (the user of one of systems 110) possesses two keys: a public one (which may be widely distributed to other parties) and a secret one. To send an encrypted message to the keyholder, the sender (the user of another system 110) uses the keyholder's public key at step 220 of FIG. 2 to encrypt the message, and transmits the ciphertext to the keyholder. The encoding and decoding schemes (steps 210, 320 of FIGS. 2 and 3) may be public. The keyholder uses its secret key at step 320 to decrypt the ciphertext. For the encryption scheme to be secure, it must be infeasible for anyone who does not possess the secret key to decrypt the transmitted ciphertext.

In a public-key signature scheme, the keyholder also uses a public key and a secret key. The keyholder signs a message at step 420 (FIG. 4) by applying its secret key to that message in a specified way. A verifier may confirm that the keyholder has signed the message by applying the keyholder's public key to the signature (at step 510 of FIG. 5), and checking (at step 520) that some specified condition is satisfied. For the signature scheme to be secure, it must be infeasible for anyone who does not possess the keyholder's secret key to "forge" the keyholder's signature on a message that the keyholder has never actually signed.

In a public-key signcryption scheme, the sender (the user of a system 110) signs a message M with the sender's secret key (see step 420 of FIG. 4) and then encrypts the signed message s(M) with the recipient's public key (see step 220 of FIG. 2), preferably in such a way that the signcryption transmission consumes less bandwidth than if the sender had sent a signature and a ciphertext separately. The recipient (at another system 110) decrypts the signcryption with its secret key, and verifies the sender's signature with the sender's public key.

In a public-key aggregate signature scheme, a set of signers $\{S_1, \ldots, S_z\}$ with respective public keys $\{PK_1, \ldots, PK_z\}$ sign the respective messages $\{M_1, \ldots, M_z\}$ in such a way that their aggregated signature—i.e., the bit string needed to verify that each signer $S_i$ signed the message $M_i$—is "short," preferably consuming less bandwidth than if each signer signed its respective message separately. The aggregate signature is verified with the public keys $\{PK_1, \ldots, PK_z\}$.

In a public-key ring signature scheme, a signer $S_i$ can choose any set of signers $\{S_1, \ldots, S_z\}$ of which $S_i$ is a member (i.e. $S_i \in \{S_1, \ldots, S_z\}$), and produce a "ring signature" on a message that will convince a verifier that at least one signer in $\{S_1, \ldots, S_z\}$ signed the message, though the verifier will not be able to determine which one. The signer $S_i$ therefore has limited anonymity within the "ring" of possible signers. The verifier uses the public keys $\{PK_1, \ldots, PK_z\}$ to verify the ring signature. Typically, a ring signature with z possible signers is as long as z separate signatures; thus, it is crucial that the underlying signature scheme be bandwidth-efficient.

Diffie and Hellman introduced the notion of public-key encryption and signature schemes in 1976, but were unable to find concrete instantiations. Rivest, Shamir and Adleman proposed the first public-key encryption and signature schemes (now known as "RSA" schemes) in their article, *A Method for Obtaining Digital Signatures and Public-Key Cryptosystems* (Communications of the ACM, v.21 n.2, p. 120-126, 1978), incorporated herein by reference.

Roughly speaking, the RSA encryption scheme is as follows. The keyholder generates a composite (i.e. non-prime) integer modulus N=pq, where p and q are large prime numbers (e.g. 512 bits). The keyholder also computes $\phi(N)=(p-1)*(q-1)$. Finally the keyholder computes integers e and d, both greater than 1, such that $ed \equiv 1 (\bmod \phi(N))$. The keyholder publishes (N, e) as its public key, and keeps p, q and d secret.

To encrypt a message M, the sender performs the operations listed immediately below under "LISTING 1":

Listing 1: RSA Encryption

Express M as an integer m in [0, N−1], and then set the ciphertext $c \equiv m^e (\bmod N)$.

End of Listing 1.

To decrypt the ciphertext, the keyholder performs the following operation:

Listing 2: RSA Decryption

Compute $c^d \equiv m^{ed} \equiv m (\bmod N)$.

End of Listing 2

Notice that the ciphertext is a number in [1, N], and is about $\log_2 N$ bits long. This description assumes no message encoding, but message encoding can also be used.

For the RSA signature scheme, the keyholder generates its keys as in the RSA encryption. To sign an appropriately encoded message $m \in [1, N]$, the keyholder performs the following operation:

Listing 3: RSA Signature

Compute $s = m^d (\bmod N)$.

End of Listing 3

A verifier, using the keyholder's public key, can confirm the signature s by performing the following operation:

Listing 4: RSA SIGNATURE

Check that $s^e \equiv m (\bmod N)$.

End of Listing 4

Again, the signature is about $\log_2 N$ bits long.

Rabin proposed slightly different encryption and signature schemes in his article, *Digitalized Signatures and Public-Key Functions as Intractable as Factorization* (MIT/LCS/TR-212, MIT Laboratory for Computer Science, Massachusetts Institute of Technology, USA 1979), incorporated herein by reference. A keyholder in this scheme generates the modulus N as in RSA, and sets its public key to be (N, e). Encryption is also the same as RSA in that the ciphertext is $c = m^e (\bmod N)$ for an appropriately encoded message m. The ciphertext is about $\log_2 N$ bits. However, Rabin's schemes use the specific value e=2. There are two reasons for this. First, setting e=2 allows very fast encryption and signature verification. Second, setting e=2 allows one to prove that the resulting schemes are hard to break, assuming that factoring the modulus N is hard. The reduction of factoring to Rabin's schemes (using appropriate encoding) is well-known in the art.

Below, a Rabin encryption scheme with OAEP+ message encoding is described. OAEP+ encoding provides provable security, in the random oracle model, against adaptive chosen ciphertexts attacks, assuming that the underlying encryption scheme is hard to break.

The OAEP+ encoding scheme uses three hash functions (at step 210 of FIG. 2), define by the following formulas (1):

$$G: \{0,1\}^{k_0} \to \{0,1\}^m,$$

$$H': \{0,1\}^{m+k_0} \to \{0,1\}^{k_1}, \text{ and}$$

$$H: \{0,1\}^{m+k_1} \to \{0,1\}^{k_0}, \quad (1)$$

where m, $k_0$, $k_1$ are predefined positive integer security parameters. For each i, the expression $\{0, 1\}^i$ denotes the set of all strings of zeroes and ones ("bit strings") of length i. The same expression also denotes the set of all bit strings of any length smaller than or equal to i; if the string length is less than i, the string can be appended with zeroes on the left up to the length i. This H function in formulas (1) is used for an intermediate value for computation of the message encoding and should not be confused with the encoded message H(M) shown at step 210 of FIG. 2. The quantities $2^{-k_0}$ and $2^{-k_1}$ should be negligible to obtain higher security, but any positive integers will work. If $n = m+k_0+k_1$, N is preferably chosen so that $2^n < N < 2^n + 2^{n-1}$. To encrypt a message $M \in \{0, 1\}^m$, the sender performs the following operations:

Listing 5: Rabin-OAEP Encryption Procedure (Step 210 (FIG. 2) corresponds to Steps 1-3 immediately below.)

1. Picks a random $r \in \{0, 1\}^{k_0}$.
2. Sets $s \leftarrow (G(r) \oplus M) \| H'(r \| M)$ and $t \leftarrow H(s) \oplus r$. Here the double bar symbol "$\|$" denotes string concatenation.
3. Sets $x \leftarrow s \| t$, an n-bit string (x corresponds to the final encoded value H(M) of step 210 of FIG. 2).
4. Step 220: Computes the ciphertext $c \leftarrow x^2 (\bmod N)$. Here the bit string x is interpreted as a number: for $x = x_0 x_1 \ldots x_{n-1}$, the number is $x_0 + x_1 * 2 + \ldots + x_{n-1} * 2^{n-1}$.

End of Listing 5.

To decrypt, the recipient performs the following operations:

Listing 6: Rabin-OAEP Decryption Procedure

1. Step 310 (FIG. 3): Compute the modular square roots of c modulo N (step 310 of FIG. 3). As is known, since N is a product of two prime numbers, c may have up to four modular square roots $x_1, X_2, X_3, X_4$, where $x_1 = -x_2$ and $x_3 = -x_4$. At least one of $x_1$ and $x_2$, and at least one of $x_3$ and $x_4$ will have n or fewer bits. Without loss of generality, let us assume that each of $x_1$ and $x_3$ has n or fewer bits.

2. Step 320: The recipient parses each candidate $x_i$ (i=1, 3) into $s_i \| t_i$ for $s_i \in \{0,1\}^{m+k_1}$ and $t_i \in \{0,1\}^{k_0}$, and then parses $s_i$ into $s_i' \| s_i''$ for $s_i' \in \{0, 1\}^m$ and $s_i \in \{0,1\}^{k_1}$. For each i=1, 3, the recipient computes $r_i \leftarrow t_i \oplus H(s_i)$ and $M_i \leftarrow s_i' \oplus G(r_i)$, and tests whether $s_i'' = H''(r_i \| M_i)$. If there is a unique i for which the condition is satisfied, the recipient outputs $M_i$ as the correct plaintext; otherwise (if there is not such i or if the condition is satisfied for both i=1 and i=3), the recipient indicates a decryption failure.

End of Listing 6.

Below, a Rabin signature scheme with message recovery using a full-domain hash is described. The expression "full domain hash" means that the hash functions (1) can have values as long as their maximum values m, $k_1$, $k_0$ respectively. Various approaches to the encoding, and even to computing modular square roots, are possible; the description below is merely one possible approach. Defining the relevant parameters as for the Rabin encryption above with the additional constraint that $p \equiv 3 \pmod 8$ and $q \equiv 7 \pmod 8$, the signer performs the following operations:

Listing 7: Rabin-OAEP Signature Procedure

Encoding step 410 (FIG. 4) corresponds to steps 1-2 immediately below.

1. Pick a random $r \in \{0, 1\}^{k_0}$.
2. Set $s'' \leftarrow H'(r\|M)$, $s' \leftarrow G(s'') \oplus M$ and $t \leftarrow H(s'') \oplus r$.
3. Set $y \leftarrow s'\|s''\|t$, an n-bit integer. The value y corresponds to H(M) of FIG. 4.

Signing step 420 (FIG. 4) corresponds to steps 4-11 immediately below.

4. Compute $u_q \leftarrow y^{(q+1)/4} \pmod q$.
5. Set $e_y \leftarrow 1$ if $u_q^2 \equiv y \pmod q$; else set $e_y \leftarrow -1$.
6. Compute $u_p \leftarrow (e_y y)^{(p+1)/4} \pmod p$.
7. Set $f_y \leftarrow 1$ if $u_p^2 \equiv e_y y \pmod p$; else set $f_y \leftarrow 2$.
8. Compute $v_q \leftarrow f_y^{(3q-5)/4} u_q \pmod q$ and $v_p \leftarrow f_y^{(3p-5)/4} u_p \pmod p$.
9. Compute $w \leftarrow v_q + q(q^{p-2}(v_p - v_q) \mod p)$.
10. Set $x \leftarrow w$ if $2w < N$; else set $x \leftarrow N-w$. The number x is a square root of $e_y y / f_y \pmod N$.
11. Output the signature $(e_y, f_y, r, x)$.

End of Listing 7.

The values of $2^{(3q-5)/4} \pmod q$, $2^{(3p-5)/4} \pmod p$ and $q^{p-2} \pmod p$ can be precomputed; so, steps 8 and 9 of Listing 7 add little to the signing time. The signature is verified as follows:

Listing 8: Rabin-OAEP Verification Procedure

1. Step 510 (FIG. 5): Compute $y_{tmp} \leftarrow e_y f_y x^2 \pmod N$.
2. Step 520: Confirm that $y_{tmp}$ is n bits, parse $y_{tmp}$ into $s_{tmp}'\|s_{tmp}''\|t_{tmp}$, compute $$M_{tmp} \leftarrow G(s_{tmp}'') \oplus s_{tmp}' \text{ and}$$

$$r_{tmp} \leftarrow H(s_{tmp}'') \oplus t_{tmp},$$

and confirm that $s_{tmp}'' = H(r_{tmp}\|M_{tmp})$.

End of Listing 8.

Notice that the message $M = M_{tmp}$ is recovered during the verification process.

The encryption and signature schemes of Listings 5-8 are as provably secure as factoring (though the proof is omitted in this description). Notice again that, although these schemes are quite efficient computationally, the bit-length of the ciphertexts and signatures is about $\log_2 N$. To be secure against modern factoring methods, N should be at least 1024 bits.

A ring signature scheme using Rabin signatures was proposed in the article, *How to Leak a Secret*, by R. L. Rivest, A. Shamir and Y. Tauman (Proc. Of Asiacrypt 2001, pages 552-565), incorporated herein by reference. Roughly speaking, for signers $\{S_1, \ldots, S_z\}$ with public moduli $\{N_1, \ldots, N_z\}$, the article proposes a ring signature as follows:

Listing 9: Ring Signature

The ring signature is $(x'_1, \ldots, x'_z)$, that satisfies the equation:

$$C_{k,v}(y_1, \ldots, y_z) = w \qquad (2)$$

where $y_i = x_i'^2 \pmod{N_i}$, v and w are given bit strings, and C is a "combining function."

End of Listing 9.

The article recommends the following combining function:

$$C_{k,v}(y_1, \ldots, y_z) = E_k(y_z \oplus E_k(y_{z-1} \oplus E_k(\ldots \oplus E_k(y_1 \oplus v) \ldots))), \qquad (3)$$

where $E_k$ is a symmetric encryption scheme using a key k. (A symmetric encryption scheme uses the same key for both encryption and decryption; a message M is encrypted into a ciphertext $E_k(M)$).

Their scheme also uses a trick to get around the fact that the moduli $N_i$ may have different bit lengths. Let $g_i$ denote the function $g_i(x_i') = x_i'^2 \pmod{N_i}$. Instead of setting $y_i = g_i(x_i')$, they define $y_i$ with respect to a domain $\{0, 1\}^b$, where $2^b$ is much larger than any of the moduli—specifically:

Listing 10: Squaring for Ring Signature

For $x_i' = q_i N_i + r_i \in [0, 2^b - 1]$, $y_i = q_i N_i + g_i(r_i)$ if $(q_i + 1)N_i \leq 2^b$ and $y_i = x_i'$ otherwise.

End of Listing 10.

Here $q_i$ is the quotient of the integer division of $x_i'$ by $N_i$, and $r_i$ is the remainder. As long as b is sufficiently large, the proportion of all $y_i$ for which $(q_i+1)N_i > 2^b$ will be negligible, so that the mapping $x_i \rightarrow y_i$ behaves almost indistinguishable from squaring modulo $N_i$.

With these considerations in mind, the ring signature is generated as follows (assume $S_i$ is the "real" signer):

Listing 11: Ring Signature

1. Compute $k = H(M)$, where M is the message to be signed, and H is a hash function.
2. Pick a random $v \in \{0, 1\}^b$.
3. For each $j \neq i$:
   3A. Pick random $x'_j \in \{0, 1\}^b$ for $j \neq i$.
   3B. Compute $y_j$ as in LISTING 10.
4. Compute $y_i$ such that $E_k(y_z \oplus E_k(y_{z-1} \oplus E_k(\ldots \oplus E_k(y_1 \oplus v) \ldots))) = v$.
5. Using secret knowledge about $N_i$, compute $x'_i$ such that $x'_i$ is mapped into $y_i$ by the mapping of Listing 10.
6. Output the ring signature $(x'_1, \ldots, x'_z, v)$.

End of Listing 11.

Regarding step 4, notice that $$y_z = E_k^{-1}(v) \oplus E_k(y_{z-1} \oplus E_k(\ldots \oplus E_k(y_1 \oplus v) \ldots)). \qquad (4)$$

Next notice that $$y_{z-1} = E_k^{-1}(y_z \oplus E_k^{-1}(v)) \oplus E_k(y_{z-2} \oplus E_k(\ldots \oplus E_k(y_1 \oplus v))). \qquad (5)$$

In general, $$y_i = E_k^{-1}(y_z \oplus E_k^{-1}(\ldots y_{i+1} \oplus E_k^{-1}(v))) \oplus E_k(y_{i-1} \oplus E_k(\ldots \oplus E_k(y_1 \oplus v))), \qquad (6)$$

and the ring signer uses this equation to compute $y_i$ from the values of the $y_j$'s, $j \neq i$. To compute $x'_i$, the ring signer computes $g_i^{-1}(y_i)$, which is essentially just the computation of a modular square root. Some values of $y_i$, in fact about three-quarters of them, do not have modular square roots; in this case, step 3 must be performed again until $y_i$ is a quadratic residue modulo $N_i$.

Listing 12: Ring Signature Verification.

1. Compute $k = H(M)$. For all j, compute the respective values of $y_j$ from $x'_j$ by inverting the mapping of Listing 10.
2. Confirm that $$E_k(y_z \oplus E_k(y_{z-1} \oplus E_k(\ldots \oplus E_k(y_1 \oplus v) \ldots))) = v. \qquad (7)$$

End of Listing 12.

In the above-described encryption and signature schemes, ciphertexts and signatures are $\log_2 N \geq 1024$ bits long. Long ciphertexts and signatures, such as these, can cause problems—particularly over channels prone to loss, since decryption and signature verification require the complete ciphertext or signature. Also, long ciphertexts and signatures are more likely to encounter problems with packet fragmentation, where the ciphertext or signature is split across more than one packet. Shorter signatures and ciphertexts are also more power efficient to transmit. According to K. Barr and K. Asanovic, *Energy Aware Lossless Data Compression* (Proc. Of MobiSys 2003), a wireless transmission of a single bit can cost more than 1000 times as much energy as a 32-bit computation. In battery operated computer systems, energy consumption required for a wireless transmission can be a significant bottleneck. Also, signal interference places physical limits on how much data can be transmitted wirelessly by a battery powered system in a given region.

From a security perspective, Rabin's schemes have the very desirable property of being provably as hard to break as factoring, a property that should be retained if possible. Accordingly, there is a need for an encryption scheme that is provably secure assuming the hardness of factoring a $\log_2 N$ bit modulus, but in which the ciphertexts are considerably shorter than $\log_2 N$ bits. There is also a need for a provably secure signature scheme in which the signatures are considerably shorter than $\log_2 N$ bits. Further, the signature scheme should preferably retain the message recovery property of the Rabin signatures.

There is also a need for advanced cryptographic schemes—such as signcryption, aggregate signatures and ring signatures—that are based on factoring, but are more bandwidth efficient than schemes that use extensions of Rabin's encryption and signature schemes.

SUMMARY

This section summarizes some features of the invention. Other features are described in subsequent sections. The invention is defined by the appended claims which are incorporated into this section by reference.

According to some embodiments of the invention, a message is processed before encryption to shorten the ciphertext. Exemplary processing is illustrated at step 610 in FIG. 6. Steps 210 (encoding), 220 (encryption) and 230 (transmission) can be like in FIG. 2. In particular, the encryption method 220 can provide ciphertexts of a length equal to some predetermined length (e.g., the length of a number less than or equal to N−1 where N is the modulus in the Rabin encryption case), and of a smaller length, and possibly of a larger length. After step 210 (encoding), the mapping step 610 is performed to map the encoded message H(M) into an intermediate number b in a predefined set B. The mapping is shown as $\pi$. The set B is some set of messages for which the encryption method 220 generates shorter ciphertexts.

Some embodiments use the Rabin encryption method at step 220, i.e. $c=b^2 \pmod{N}$. In some embodiments, $B=B_{N,Q}=\{x\in[1,N]:x^2 \pmod{N} \in Q\}$ where Q is a proper subset of all integers modulo N. In some embodiments, Q is the sub-range $[h, h']$ for some integers $h, h'$ such that $h'-h < N$. For these Q, the set $B_{N,Q}$ will be denoted as $B_{N,h,h'}$. Thus, $B_{N,h,h'}=\{x\in[1,N]:h \leq x^2 \pmod{N} \leq h'\}$.

The numbers of the set $Z_N$ of all integers modulo N can be represented as points on a circle in a well known manner. The sub-range $[h, h']$ is either the set $\{h, h+1, \ldots h'\}$ or the set $\{h', h'+1, \ldots h\}$. To avoid ambiguity, it will be assumed throughout herein that $[h, h']$ is the smallest of the two sub-ranges unless a difference meaning is stated explicitly or is clear from the context. In particular, h may be represented by a number less than h. For example, if $h=N-1=-1 \pmod{N}$ and $h'=1$, then $[h,h']=\{N-1, N, 1\}=\{N-1,0,1\}$.

Given $h'-h$, a good choice for the numbers $h, h'$ is $h=0$ or $-h=h'$, since, among the sub-ranges of width $h'-h$, the sub-ranges that are close to 0 have numbers with the shortest bit-length.

In some embodiments, similar results are achieved if $B_{N,Q}$ is replaced by $B^2_{N,Q}=\{x\in[0, N/2]:x^2 \pmod{N} \in Q\}$ or $B^Z_{N,Q}=\{x\in Z_N^*:x^2 \pmod{N} \in Q\}$. Here $Z_N^*$ is the set of all integers $x\in[0,N/2]$ that are invertible modulo N (i.e. that do not have a common divisor with N). If $Q=[h, h']$, then $B^2_{N,Q}$ will be denoted as $B^2_{N,h,h'}$, and $B^Z_{N,Q}$ will be denoted as $B^Z_{N,h,h'}$.

In some embodiments, the encoded message H(M) is a short message, in some interval $[0,h'']$ where $h''<N$. Also, the encoding step 210 (FIG. 6) can be omitted, with the mapping $\pi$ applied at step 610 to the plaintext M to map M into b. The plaintext M may be in $[0,h'']$. With respect to the terminology, even if the mapping step 210 is present, the term "encoding" can be used to describe a combination of steps 210, 610 that convert the plaintext M to a number $b \in B$.

The decryption (FIG. 7) can be the reverse of the encryption process. The short ciphertext c is received by the recipient at step 304 (as in FIG. 3) and decrypted at step 310 to recover the intermediate message $b \in B$. The decryption method 310 can decrypt ciphertexts of a length equal to some predetermined length (e.g. the length of a number less than or equal to N−1 where N is the modulus in the Rabin decryption case) and of a smaller length, and possibly of a larger length. The inverse mapping $\pi^{-1}$ is applied at step 710 to map b into H(M). Then H(M) is decoded (step 320) to recover the plaintext M.

In some embodiments of the present invention, short signatures are provided. FIG. 8 illustrates one signature method embodiment. At step 410, a message M is encoded into H(M) as in FIG. 4. In some embodiments, the message H(M) is in a sub-range $[h,h']$ discussed above. At step 420, a signing method is applied to sign the message and obtain an intermediate signature b. The signing method (e.g. a modular square root computation) is suitable for all messages H(M) of a length shorter than or equal to a predetermined length, and possibly of a larger length. The steps 410, 420 may or may not be as in prior art. Some embodiments use the Rabin signature with OAEP+ encoding. However, the intermediate signature b is in a set B of the type described above. In some embodiments, this is achieved by limiting the messages M to a set of messages whose encoding H(M) has a signature in B. In some embodiments, the encoded message H(M) is short (shorter than some predetermined length), e.g. $H(M) \in [0,h'']$ for some $h''<N$, and the signature method 420 maps any short message into the set B. Of note, the intermediate signature b may be a long bit string.

At step 810, a mapping $\theta$ is applied to map the intermediate signature b into a short signature s. At step 430, the signature s is transmitted to the recipient.

The signature verification is shown in FIG. 9. The short signature s is received by the recipient computer system 110 at step 504. The inverse mapping $\theta^{-1}$ is applied at step 910 to recover the intermediate signature b. At steps 510, 520 a verification is performed. For example, at step 510, the intermediate signature can be processed to recover H(M). At step 520, a verification can be performed as in step 520 of FIG. 5. The method of steps 510, 520 is suitable to verify signatures of messages H(M) of a length equal to some predetermined length (e.g the length of number N−1 where N is the modulus) and of a shorter length, and possibly of a larger length.

In some embodiments, the set B has a lower cardinality than the set of all messages, but the individual messages in B can be longer than any encoded message H(M). For this reason, the mappings $\pi^{-1}$ and $\theta$ will be generally referred to as compression, and the mappings $\pi$ and $\theta^{-1}$ as decompression. The invention is not limited to the cases in which actual compression or decompression occurs, i.e. to embodiments in which the mapping $\pi^{-1}$ or $\theta$ maps each number into a shorter number, or in which the mapping $\pi$ or $\theta^{-1}$ maps each number into a longer number.

In some public key encryption and signature embodiments, the ciphertext and signature sizes are at most about $\frac{2}{3} \log_2 N$ bits, rather than the usual $\log_2 N$ bits. At the same time, the security of the compression and signature schemes is based on factoring a considerably larger ($\log_2$ N)-bit number N.

In some embodiments, the mapping θ maps numbers in $B^2_{N,h,h'}$ to bit strings of length $c_1+\log_2(h'-h)$ for a small constant $c_1$, when h'−h is about $8*N^{2/3}$ or more. In some embodiments, $c_1<3$. In some embodiments, the mapping π maps bit strings of length $-c_2+\log_2(h'-h)$ to numbers in $B^2_{N,h,h'}$ where $c_2$ is a small constant. In some embodiments, $c_2=\log_2 5<3$. In some public key encryption and signature embodiments, both mappings are public—i.e., the mappings, as well as their inverses, can be efficiently computed without requiring any secret information.

In some embodiments, a bandwidth-reduced signcryption scheme is provided. The sender uses two versions of the θ mapping—say, $θ_A$ and $θ_B$—that are used in connection with the sender's public key $N_A$ and the recipient's public key $N_B$. $N_A$ and $N_B$ may have about the same bit length but this is not necessary. In some embodiments, the signcryption is a construct ($c_1+\log_2(h'-h)$)-bits long. This signcryption simultaneously encrypts a message so that it is decipherable by the recipient and contains the sender's signature on the message, which the recipient can verify using the sender's public key.

In some embodiments, a bandwidth-reduced aggregate signature scheme is provided. The signers $\{S_1, \ldots, S_z\}$ have public keys $\{N_1, \ldots, N_z\}$, and they sign the messages $\{M_1, \ldots, M_z\}$ in sequence, meaning that signer $S_i$ produces signature $s_i$ on $M_i$ after receiving $s_{i-1}$ from $S_{i-1}$. The keys $N_i$ may have approximately the same bit lengths but this is not necessary. In some embodiments, each $s_{i-1}$ is a compressed (by $θ_{i-1}$) representation of an element of B where B may or may not depend on i. For example, B may be $B^2_{N,h,h'}$ where N, h and h' may or may not depend on i, and $s_i$ is essentially computed as a compressed square root modulo $N_i$ of a number in [h,h']. That number depends on $s_{i-1}$ and $M_i$.

In some embodiments, a bandwidth-reduced ring signature scheme is provided. In some embodiments, the Rivest-Shamir-Tauman ring signature scheme is improved by allowing the values of $(x_1', \ldots, x_z')$ of LISTING 9 above to be shorter, using the present invention's compression method, in combination with other techniques of the present invention.

Other features and advantages of the invention are described below. The invention is defined by the appended claims.

DETAILED DESCRIPTION OF SOME EMBODIMENTS

1. Preliminaries

Figure 1:
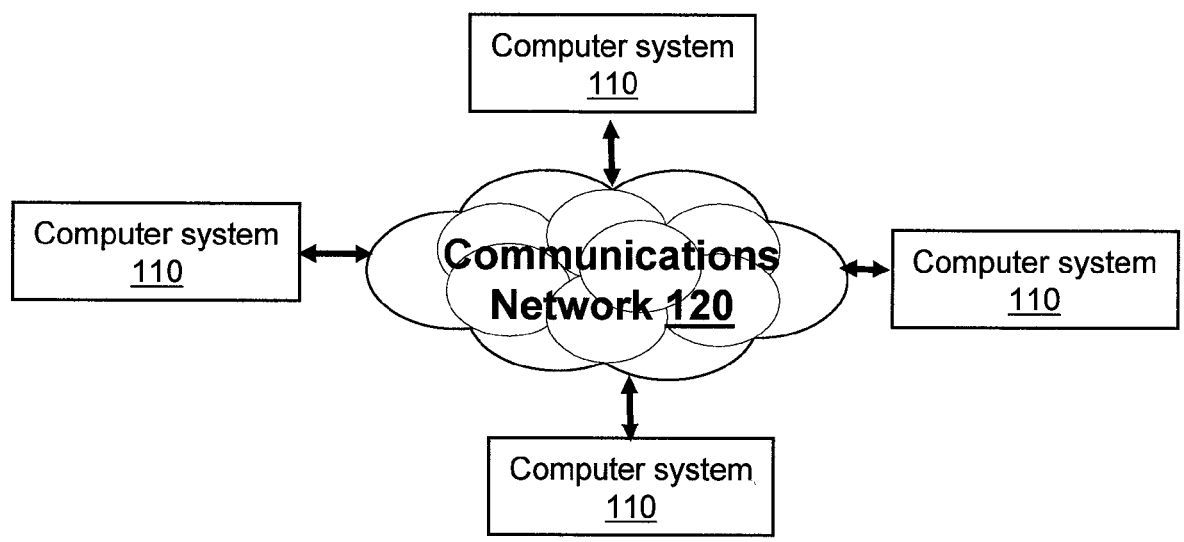
FIG. 1 is a block diagram of a system suitable for use with both prior art cryptographic schemes and with some embodiments of the present invention.
Figure 2:
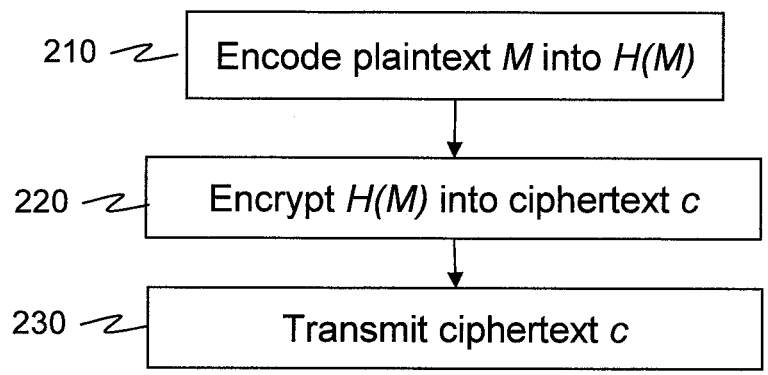
FIG. 2 is a flowchart of a prior art encryption method.
Figure 3:
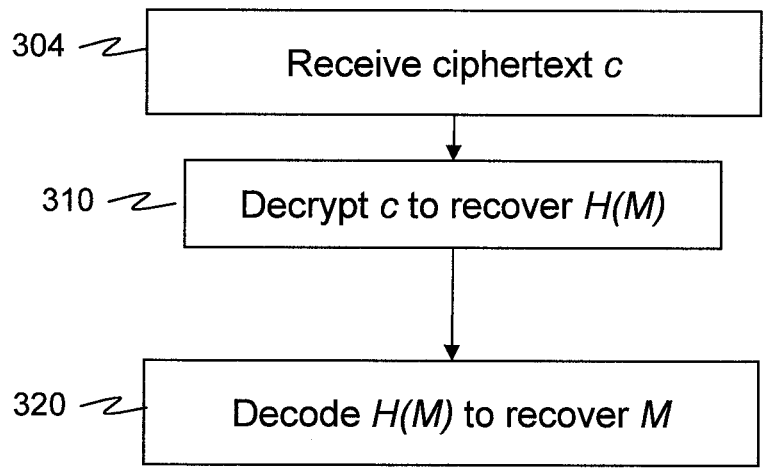
FIG. 3 is a flowchart of a prior art decryption method.

The subsequent description uses some mathematical notation, much of which is gathered here for convenience. Let $\{0, 1\}^*$ denote the set of all bit strings, and let $\{0, 1\}^n$ denote the set of all bit-strings of length n. The latter expression also denotes the set of all bit strings of a length smaller than or equal to n; if the string length is less than n, the string can be appended with 0's on the left up to the length n. Typically, H will denote a cryptographic hash function and/or an encoded message. Various cryptographic hash functions are well-known in the art—e.g., SHA-1 and MD5 (see e.g. RFC-2104, Request for Comments, Networking Working Group, H. Krawczyk et al., *HAMC: Keyed-Hashing for Message Authentication*, February 1997, incorporated herein by reference). It is desirable for hash functions to be collision resistant—i.e., it is computationally hard to find $m_1 \neq m_2$ such that $H(m_1)=H(m_2)$.

For a real number r, $\lceil r \rceil$ denotes the ceiling of r, that is, the smallest integer value greater than or equal to r. Similarly, $\lfloor r \rfloor$ denotes the floor of r, that is, the largest integer value less than or equal to r. Finally, $\lfloor r \rceil$ denotes the closest integer to r Symbol || denotes concatenation.

Throughout, N will denote an integer modulus. For good security, N should be computationally hard to factor. In practice, one often generates N as the product of two large prime numbers p and q—e.g., 512 bits apiece. However, as has been observed in the cryptographic literature, there are often efficiency advantages in setting $N=p^d q$ for d>1. In the schemes of the present invention, N can take any form; however, in the subsequent description, we assume N=pq for convenience.

A "lattice" consists of the set of all vectors that can be generated as integer linear combinations of a set of basis vectors. For example, if (a, b) and (c, d) are two basis vectors in a two-dimensional space, the lattice generated by them is the set of vectors $\{(k_1 a+k_2 c, k_1 b+k_2 d):k_1, k_2 \in Z\}$. Z is the set of all integers.

2. More Preliminaries: The Distribution of Numbers in $B^2_{N,h,h'}$

If quadratic residues modulo N were distributed uniformly, then it would be expected that $B^2_{N,h,h'}$ contain about h'−h numbers. Assuming for the moment that $B^2_{N,h,h'}$ does contain h'−h numbers, it is possible—from an information theoretic perspective—to uniquely represent each number in $B^2_{N,h,h'}$ using $\lceil \log_2(h'-h) \rceil$ bits. However, the numbers in $B^2_{N,h,h'}$ are scattered across the interval [1, N/2] in a way that seems random; thus, it is not at all clear that one can compute a number's unique representation efficiently—i.e., using a method whose computational complexity is at most $O((\log N)^c)$ for a small constant c. (The letter c will be used both for constants and for ciphertexts, and these two uses should not be confused.)

Analyzing the Local Distribution of $B^2_{N,h,h'}$

To develop a compact representation of numbers in $B^2_{N,h,h'}$ that is efficiently computable and invertible, it is desirable to understand how numbers in $B^2_{N,h,h'}$ are distributed in $[1, N/2]$. This distribution has been studied for $-h=h'=4N^{2/3}$ in connection with the factoring problem (the problem of finding the prime factors of the number N) by B. Vallée, *Provably Fast Integer Factoring with Quasi-Uniform Small Quadratic Residues* (Proc. Of STOC 1989, pages 98-106), incorporated herein by reference. Vallée analyzed the distribution of numbers in $B^2_{N,h,h'}$ for $-h=h'=4N^{2/3}$. Using her observations, a factoring method has been developed that has a provably low computational complexity (though the complexity is still far too high to factor very large numbers (e.g., 1024-bit)), using a subroutine that draws numbers from $B=B^2_{N,h,h'}$ "quasi-uniformly"—i.e., in such a way that, for some constant c, the probability that a given number is drawn is no more than c times the probability that any other number is chosen.

Although Vallée does not develop a compression method (such as that utilized by the present invention)—indeed, in Vallée's discussion of factoring methods, such a compression method seems pointless—Vallée's observations on the distribution of $B^2_{N,h,h'}$ are useful. Here are some of Vallée's observations.

Farey Sequences:

The Farey sequence $F_k$ of order k is the ascending sequence $$\left(\frac{0}{1}, \frac{1}{k}, \ldots, \frac{1}{1}\right)$$

of fractions $$\frac{a_i}{b_i} (i = 0, 1, 2, \ldots)$$

with $1 \leq a_i \leq b_i < k$ and $\gcd(a_i, b_i) = 1$, except that $a_1 = 0$. The expression "gcd" stands for greatest common divisor.

The characteristic property of Farey sequences is expressed in the following theorem:

Theorem 1.

If $$\frac{a_i}{b_i} \text{ and } \frac{a_{i+1}}{b_{i+1}}$$

are consecutive in $F_k$, then $b_i a_{i+1} - a_i b_{i+1} = 1$.

Another useful theorem concerning Farey sequences is the following:

Theorem 2.

If $$\frac{a_i}{b_i} \text{ and } \frac{a_{i+1}}{b_{i+1}}$$

are consecutive in $F_k$, then $b_i + b_{i+1} > k$.

Farey sequences lead naturally to the notion of a Farey covering:

Farey Covering:

The Farey covering of order k of the interval $[0, N/2]$ is the set of open Farey intervals $I(a_i, b_i)$ where $i=0, 1, 2, \ldots$, each interval $I(a_i, b_i)$ having the center $$\frac{a_i N}{2 b_i}$$

and radius $$\frac{N}{2 k b_i},$$

where $1 \leq a_i \leq b_i \leq k$ and $\gcd(a_1, b_1) = 1$ except that $a_1 = 0$.

Figure 10A:
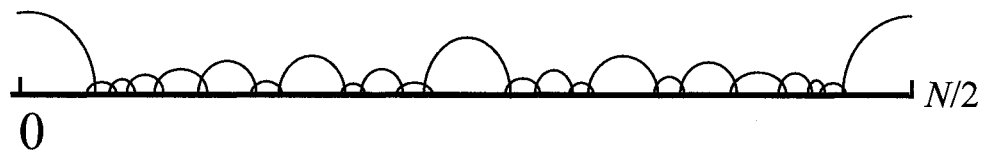
FIGS. 10A, 10B illustrate a Farey covering and a Farey partition respectively.

FIG. 10A illustrates a Farey covering.

Using the above theorems 1 and 2, one can easily prove that every real number in $[0, N/2]$ is covered by at least one, and at most two, Farey intervals.

The ensuing discussion also uses the Farey partition (illustrated in FIG. 10B), which is closely related to the Farey covering:

Farey Partition:

The Farey partition of order k of the interval $[0, N/2)$ is the set of intervals $$J(a_i, b_i) = \left[\frac{N(a_{i-1} + a_i)}{2(b_{i-1} + b_i)}, \frac{N(a_i + a_{i+1})}{2(b_i + b_{i+1})}\right), \quad (8)$$

where $i = 0, 1, 2, \ldots$, and where $1 \leq a_i \leq b_i \leq k$, $\gcd(a_i, b_i) = 1$, except that $a_0 = a_{-1} = b_{-1} = 0$.

The Farey partition intervals are closed on the left (include the end point), but they can also be defined as closed on the right and open on the left. (They are defined here so as not to intersect and to cover 0, but this is not necessary.)

Figure 10B:
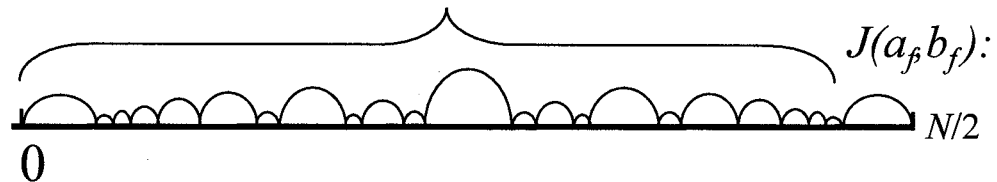

The intervals $J(a_i, b_i)$ form a partition that covers all of $[0, N/2]$ except a small interval adjoining $N/2$, shown as $J(a_f, b_f)$ in FIG. 10B, where f is the maximum i index for $a_i, b_i$. Thus, $a_f = b_f = 1$. If we define $a_{f+1} = b_{f+1} = 0$, then $J(a_f, b_f)$ can be defined by the general formula (8).

By using the theorems 1 and 2 again, one can prove that $J(a_i, b_i)$ contains $J(a_i, b_i)$. Also, the interval $I(a_i, b_i)$ is no more than twice as wide as the interval $J(a_i, b_i)$.

Farey sequences have a close connection with the distribution in $[0, N/2]$ of integers in $B^2_{N,h,h'}$. In particular, the gaps between successive elements of B have large variations near the rationals $a_i N/2 b_i$ of small denominator $b_i$. However, as one considers wider and wider ranges centered at $a_i N/2 b_i$, the distribution of the B-elements "evens out"—i.e., the ratio of the number of B-elements in the interval, versus the number one would expect if the B-elements were distributed uniformly, approaches 1. Roughly speaking, the interval width needed before the dumpiness can be disregarded is inversely proportional to $b_i$—hence, the connection between Farey intervals, defined above, and the distribution of elements in B.

Vallée proved the following theorem:

Theorem 3.

For $-h=h'=4N^{2/3}$ and $$k = \frac{N}{h'} = 1/4 N^{1/3},$$

the subset $B^2_{N,h,h'}$ and the Farey covering of order k are quasi-independent.

The term quasi-independent is defined as follows: A subset X and a covering $Y = \{Y_j\}$ of $Z_N$ ($Z_N$ denotes the set of all integers modulo N) are quasi-independent if, for all j, the sets X and $Y_j$ are $(l_1, l_2)$-independent for some positive constants $l_1$ and $$l_2 - i.e., l_1 \le \frac{P(X \cap Y_j)}{P(X)P(Y_j)} \le l_2.$$

P is the uniform probability measure on the set $Z_N$. For $B^2_{N,h,h'}$ with $h'=4N^{2/3}$ and the Farey order $k=\frac{1}{4}N^{1/3}$, Vallée proves that $$l_1 = \frac{1}{5}$$

and $l_2=4$ suffice.

Vallée's method for proving this theorem is, in some sense, constructive. By looking closely at how elements of B are structured within a Farey interval—i.e., "locally"—Vallée is able to provide a rough enumeration of the interval's B-elements that gives upper and lower bounds on the number of these elements. Using this rough enumeration, Vallée provides a method for choosing elements from B that are in the Farey interval "quasi-uniformly." Formally, a drawing method C, defined over a finite set U with the uniform probability P, and with values in a subset X of $Z_N$, is said to be $(l_1, l_2)$-uniform (or quasi-uniform) if, for all $x \in X$, $$\frac{l_1}{|X|} \le P(u \in U \mid C(u) = x) \le \frac{l_2}{|X|}.$$

Given that the elements of B are distributed among the Farey intervals quasi-uniformly, this straightforwardly leads to a "global" method for choosing elements from B in [1, N] "quasi-uniformly."

Suppose one would like to select, with a quasi-uniform distribution, a number in $B^2_{N,h,h'}$ that is in the Farey interval $I(a_i, b_i)$. Let $$x_0 = \left\lfloor \frac{a_i N}{2b_i} \right\rceil \text{ be the closest integer to } \frac{a_i N}{2b_i}, \tag{9}$$

and $$x_0 = \frac{a_i N}{2b_i} + u_0 \text{ for } |u_0| \le \frac{1}{2}.$$

Figure 11:
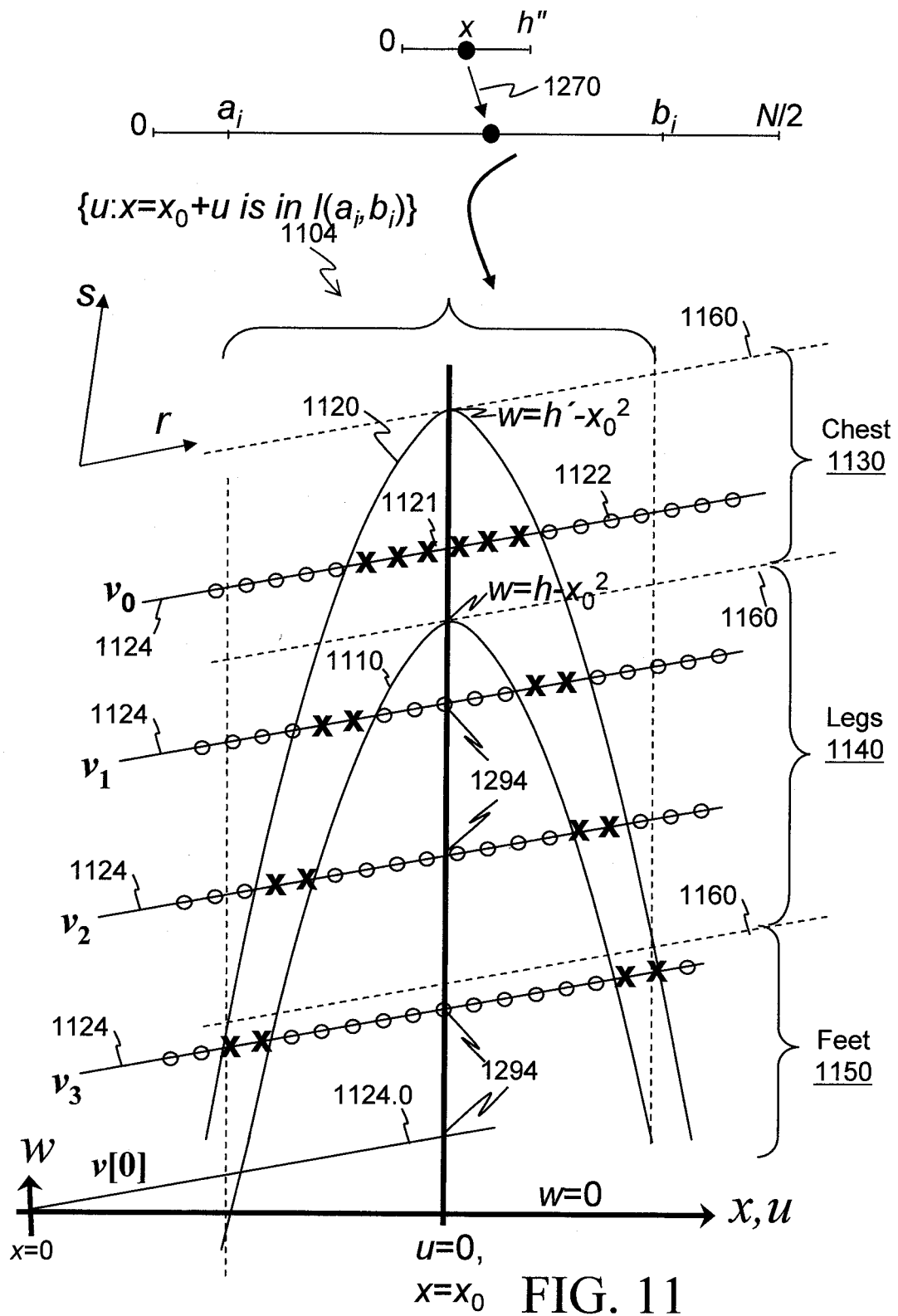
FIG. 11 is a graph illustrating some features of compression and decompression methods used in some embodiments of the present invention.

Vallée provides an elegant characterization of the integers $$x = x_0 + u \tag{10}$$

that are in $B^2_{N,h,h'} \cap I(a_i, b_i)$ for $h'=4N^{2/3}$ by relating these integers to points in a two-dimensional lattice that fall in between two particular parabolas. In FIG. 11, the interval $\{u: x=x_0+u \in I(a_i, b_i)\}$ is shown at 1104, and the two parabolas at 1110, 1120.

If x is in $B^2_{N,h,h'}$, then $h \le x_0^2 + 2x_0 u + u^2 \pmod{N} \le h'$. Now, let $L(x_0)$ be the lattice generated by the vectors $(1, 2x_0)$ and $(0, N)$. Then, $x=x_0+u$ is in $B^2_{N,h,h'}$ precisely when there is a w such that $(u, w) \in L(x_0)$ and $$h \ge x_0^2 + w + u^2 \le h' \tag{11}$$

The requirement (11) implies that (u, w) is between the parabolas 1110, 1120 defined by the formulas $x_0^2 + w + u^2 = h$ (this is parabola 1110 in FIG. 11) and $x_0^2 + w' + u'^2 = h'$ (parabola 1120).

If x is in $I(a_i, b_i)$, then $$\|u + u_0\| < \frac{N}{2kb_i} = \frac{h'}{2b_i}, \text{ where } x_0 = \frac{a_i N}{2b_i} + u_0$$

and the symbol ∥ denotes the absolute value. Thus, each integer $x=x_0+u$ that is in both $B^2_{N,h,h'}$ and $I(a_i, b_i)$ corresponds to a lattice point in:

$$P(a_i, b_i) = \left\{ \begin{array}{l} (u, w) \in L(x_0) | \|u + u_0\| \le \frac{h'}{2b_i} \\ \text{and } h \le x_0^2 + w + u^2 \le h' \end{array} \right\}. \tag{12}$$

The points in $P(a_i, b_i)$ are shown at 1121 with crosses in FIG. 11, and the remaining lattice $L(x_0)$ points at 1122 with circles.

It may seem like a fairly complicated task to figure out which lattice points in $L(x_0)$ are between the parabolas 1110, 1120. Fortunately, as Vallée describes, it is possible to find a lattice basis of $L(x_0)$ in which the basis vectors are each short, with one basis vector being "quasi-horizontal" and the other being "quasi-vertical." The basis is (r, s) with:

$$r = b_i(1, 2x_0) - a_i(0, N) = (b_i, 2b_i u_0), \tag{13}$$

$$s = b_{i-1}(1, 2x_0) - a_{i-1}(0, N) = \left(b_{i-1}, \frac{N}{b_i} + 2b_{i-1}u_0\right). \tag{14}$$

Recall that $b_i \le k$, where $$k = \frac{1}{4}N^{\frac{1}{3}}.$$

Vallée proves the following
Theorem 4.

All of the points in $P(a_i, b_i)$ are on lines parallel to r that intersect the vertical axis w at ordinate $w_0 - vN/b_i$ for some rational index $v \in [0, h'^2/4b_i N + 2h'b_i/N]$, where $w_0 = h' - x_0^2 - u_0^2$. Consecutive indices v differ by 1.

These lines are shown at 1124 in FIG. 11.

Vallée then roughly enumerates the points in $P(a_i, b_i)$ by enumerating the quasi-horizontal lines 1124 parallel to r according to their index v, and then either counting or approximating the number of points in $P(a_i, b_i)$ on each line 1124.

In particular, Vallée defines four "special" indices that split the space in between the two parabolas into a "chest" 1130, "legs" 1140, and "feet" 1150. One can easily see how the space between two parabolas may form a shape that looks likes two "legs" 1140 connected at the top; the top portion 1130 is the "chest", and the "feet" 1150 are formed where the "legs" encounter the edge of the Farey interval $I(a_i, b_i)$. The chest, leg and feet region boundaries are defined by lines 1160 parallel to the r vector. The special indices are defined as follows:

Definition 1:

$v_0$ is the first (smallest) index of the domain;

$v_1$, the first index of the legs, is the least index greater than or equal to $4hb_i/N$;

$v_2$, the last index of the legs, is the greatest index less than $h'^2/4b_i N$; and $v_3$ (in feet 1150) is the greatest index less than $h'^2/(4b_i N)+ 2h'b_i/N$.

Since $b_i \leq k = N/h'$, the chest 1130 contains at most 4 lines and the feet 1150 at most 2 lines. Thus, in enumerating the points in $P(a_i, b_i)$, one can quickly get an exact count for how many points are in the chest and the feet. However, the legs may be very long, and may contain up to $O(N^{1/3})$ lines (on the order $N^{1/3}$ as N goes to infinity). Fortunately, Vallée was able to prove the following theorem:

Theorem 5 ("Leg Theorem"):

The number n(v) of points in $P(a_i, b_i)$ on any line 1124 with an index v in the legs satisfies:

$$\frac{h'}{\sqrt{v b_i N}} \leq n(v) \leq \frac{7}{2} \frac{h'}{\sqrt{v b_i N}}.$$

Below, the value $$VLB = \frac{h'}{\sqrt{v b_i N}} \quad (15)$$

will be referred to as Vallée's lower bound, and $$VUB = \frac{7}{2} \frac{h'}{\sqrt{v b_i N}} \quad (16)$$

as Vallée's upper bound.

The VLB and VUB bounds can be used to obtain lower and upper bounds on the total number of lattice points in $P(a_i, b_i)$ in the legs, using the inequalities below that are valid for all positive integer a and b such that a<b:

$$\sum_{v=a}^{b} \frac{1}{\sqrt{v}} > \int_{a}^{b+1} \frac{dv}{\sqrt{v}} = 2(\sqrt{b+1} - \sqrt{a}) \quad (17)$$

$$\sum_{v=a}^{b} \frac{1}{\sqrt{v}} < \frac{1}{\sqrt{a}} + \int_{a+1}^{b} \frac{dv}{\sqrt{v}} = \frac{1}{\sqrt{a}} + 2\sqrt{b} \quad (18)$$

Using the Leg Theorem, one can impose a rough enumeration on the lattice points in $P(a_i, b_i)$—even though the legs 1140 may have a large number of lines 1124—by counting the points left-to-right on each line 1124. The points are enumerated first in the chest, then in the feet, then in the legs. In each of the chest, feet, and legs regions, the points are enumerated first on the top line 1124 of that region, then on the next line down, and so on. Using this rough enumeration, one can draw numbers from $B^2_{N,h,h'}$ that are in the given Farey interval quasi-uniformly.

Vallée's Quasi-Uniform Drawing Method.

Vallée used the above results in the following "global" drawing method, which selects numbers in $B^2_{N,h,h'}$ quasi-uniformly for $-h = h' = 4N^{2/3}$. Below, $n_c$ denotes the number of points in chest 1130, $n_f$ the number of points in feet 1150, $n_{c+f} = n_c + n_f$ (the total number of points in the chest and the feet), and $n_1$ the number of points in legs 1140.

Listing 13: Vallée's Quasi-Uniform Drawing Method
1. Randomly Select a Locality: Pick a random integer $x \in [1, N]$ chosen with a uniform distribution.

2. Determine Farey Interval: Using continued fractions, compute $(a_i, b_i)$ for which x is in $J(a_i, b_i)$, where $J(a_i, b_i)$ is a Farey partition interval for the interval $[0, N/2)$ of order $k = \frac{1}{4} N^{1/3}$.

3. Approximate the Number of Points in $P(a_i, b_i)$: Compute $x_0 = \lfloor a_i N / 2 b_i \rfloor$, count exactly the number $n_{c+f}$ of points in the chest and feet, and obtain an approximation $n_1$ on the number of points in the legs using Vallée's lower bounds (15) and formula (17).

4. Pick a Point from $P(a_i, b_i)$: Randomly select an integer $t \in [1, n_{c+f} + n_1]$ with uniform distribution. If $t < n_{c+f}$, output the appropriate point from the chest or feet. Otherwise, use formula (17) to determine which quasi-horizontal line 1124 would contain the point number $(t - n_{c+f})$ in the legs if each line met Vallée's lower bounds, and randomly choose a point in $P(a_i, b_i)$ on that line with uniform distribution.

5. Compute x' from the Chosen Point from $P(a_i, b_i)$: Let (u, w) be the lattice point output by the previous step. Set $x' = x_0 + u$. Output x'.

End of Listing 13.

Notice that $x' \in B^2_{N,h,h'}$, and that x' is in the same Farey interval as x. The Farey intervals vary in width; recall that $I(a_i, b_i)$ has the diameter $$\frac{N}{b_i k},$$

and that $1 \leq b_i \leq k$. Wider Farey intervals are more likely to be selected in the first two steps, but since wider Farey intervals contain more B-elements, any particular B-element in a selected Farey interval has a low probability of being chosen if the Farey interval is wide. On balance, these factors "even" out, allowing a global quasi-uniform drawing method.

In J.-S. Coron's article, *Security Proof for Partial-Domain Hash Signature Schemes* (Proc. Of Crypto 2002, LNCS 2442, pages 613-626, Springer-Verlag, 2002), incorporated herein by reference, Coron extends Vallée's techniques to create a drawing method for $B^2_{N,h,h'}$ for $$h' - h = O(N^{\frac{2}{3} + \varepsilon})$$

and with $\varepsilon$ being a positive constant, that draws elements with a distribution statistically indistinguishable from uniform—specifically, with a distribution whose statistical distance from the uniform distribution is at most $$16 N^{-\frac{3\varepsilon}{13}}.$$

With this enhancement, Coron is able to prove the security of a "partial-domain hash" signature scheme. In this scheme, the signature is essentially a modular square root of a number in $B^2_{N,h,h'}$. However, in Coron's partial-domain hash signature scheme, the signature is not short; signatures are expressed as $(\log_2 N)$-bit numbers. In contrast, in some embodiments of the present invention, a lossless compression θ (FIG. 8, step 810) is applied to a Coron partial-domain hash signature to get a bandwidth-reduced partial-domain hash signature.

Like Vallée, Coron considers the lattice points that fall in between the two parabolas 1110, 1120 (FIG. 11); however, Coron considers the local region $J(a_i, b_i)$ rather than $I(a_i, b_i)$ and splits up the region between the two parabolas using different quasi-horizontal lines. Coron defines $v_0$ and $v_3$ like Vallée, but $v_1$ and $v_2$ are the indices of the first and last lines that do not intersect either parabola before they encounter the edges of $I(a_i, b_i)$ (and, hence, have passed over the edge of $J(a_i, b_i)$). The values of $v_1$ and $v_2$ are close to $$\frac{N}{4k^2 b_i}$$

and $(h'-h)b_i/N$. The value of $v_3$ is defined slightly differently, as being close to $$(h'-h)b_i/N + \frac{N}{4k^2 b_i},$$

since Coron considers the case where h' is not necessarily equal to N/k. Coron only draws lattice points on lines with indices from $v_1$ to $v_2$, so that points on lines with indices from $v_0$ to $v_1$ or $v_2$ to $v_3$ have no chance of being chosen. However, for the parameters that Coron considers—namely, $$h' - h = N^{\frac{2}{3}+\varepsilon}, k = N^{\frac{1}{3}-\frac{\varepsilon}{13}}, \text{ and } N^{\frac{1}{3}-\frac{4\varepsilon}{13}} \leq b_i \leq k -$$

the fraction of excluded lattice points is negligible, and the drawing method is very close to uniform. The value of $\epsilon$ is preferably chosen so that $$16 N^{-\frac{3\varepsilon}{13}}$$

is very small.

3. Some Embodiments of the Present Invention

Compression

Turning now to the present invention, some embodiments of the invention make use of compression and decompression methods $\pi$, $\theta$, $\pi^{-1}$, $\theta^{-1}$ that provide mappings between numbers in $B^2_{N,h,h'}$ and bit strings in $\{0, 1\}^n$ for $n = c_1 + \log_2(h'-h)$ for a constant c close to zero. These mappings are not permutations; however, since the image of an element under each mapping or its inverse has a small constant cardinality, the mappings are herein referred to as "quasi-permutations."

Formally, for sets X and Y and for constants $(l_1, l_2, l_3, l_4)$, define $\pi: X \times R \rightarrow Y$ to be an $(l_1, l_2, l_3, l_4)$-quasi-permutation if:

For all x∈X, the cardinality of $\{\pi(x, r):r \in R\}$ is in $[l_1, l_2]$.

For all y∈Y, the cardinality of $\{x: \exists r \text{ with } \pi(x, r)=y\}$ is in $[l_3, l_4]$. (19)

Above, R is an auxiliary set—e.g., it may be used as a source of random bits if one wishes to make $\pi$ randomized. The purpose of R is simply to make $\pi$ an actual "mapping," with a single output for a given input (even though for a single x∈X there may be multiple outputs). R can be empty. Notice that an actual permutation is a (1, 1, 1, 1)-quasi-permutation.

In FIGS. 6-9, the set R is implicit. R can be a source of random bits.

Below, two quasi-permutations are described: one that the inventor has found to perhaps be more appropriate for encryption, and another that the inventor has found to perhaps be more appropriate for signatures. However, the invention is not limited to one or the other quasi-permutation in relation to encryption or signatures.

Let $\pi: \{0,1\}^{-c_1+\log_2(h'-h)} \times R \rightarrow B^2_{N,h,h'}$ be the quasi-permutation that may be more appropriate for encryption and let $\theta: B^2_{N,h,h'} \times R \rightarrow R\{0,1\}^{-c_2+\log_2(h'-h)}$ be the quasi-permutation that may be more appropriate for signatures, for small non-negative constants $c_1$ and $c_2$. Both $\pi$ and $\theta$, as described in more detail below, are efficiently computable and efficiently invertible—i.e., it is easy to recover the possible values of x from $\pi(x, r)$ or $\theta(x, r)$—without any trapdoor information.

3.1 Mapping Short Strings to B-Elements (The $\pi$ Quasi-Permutation)

An approach to computing $\pi$ and $\pi^{-1}$ for the methods of FIGS. 6 and 7 according to some embodiments of the present invention will now be described. In essence, $\pi$ maps a short bit string to a B-element by interpreting the bit string as specifing a Farey interval and an "address" within that Farey interval and then mapping the bit string to the B-element with that address in that Farey interval. The short bit strings are numbers in some interval [0,h"] for some h"<N. The inverse, $\pi^{-1}$, is essentially computed by determining the B-element's Farey interval and address in that Farey interval, wherein B-element is then mapped to the bit string that represents that interval/address combination.

This approach uses the following observation: Vallée's theorems 3 and 5, and the inequalities (15) and (16) are valid for all h, h' and not only $-h = h' = 4N^{2/3}$, provided that the Farey order $$k = \frac{2N}{h' - h},$$

and provided that in Theorem 5 and formulas (15)-(16), the variable h' is replaced with (h'-h)/2. Also, Theorem 5 remains valid without any replacements.

Figure 12:
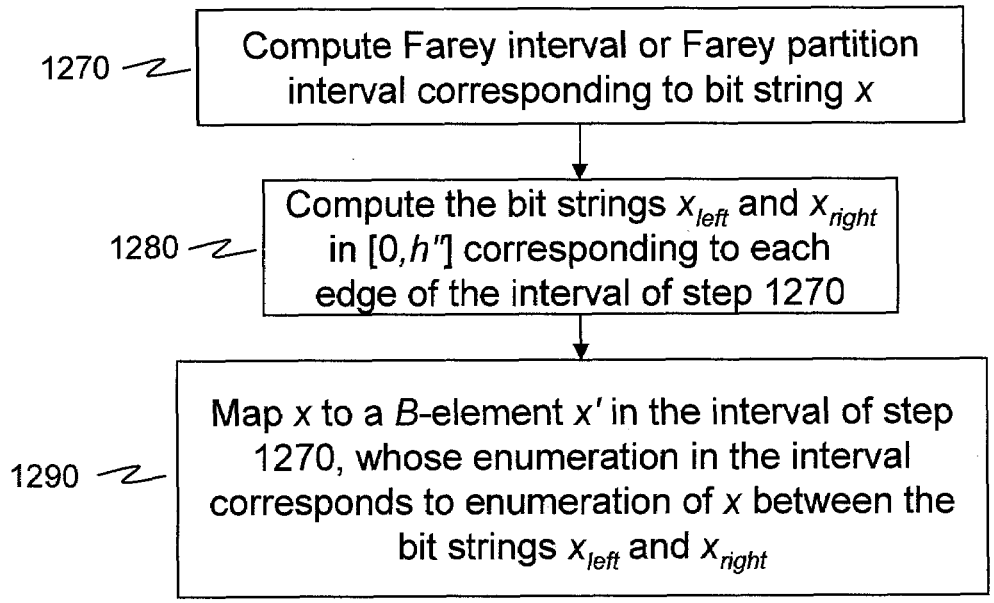
FIG. 12 is a flowchart of a decompression method according to some embodiments of the present invention.

FIG. 12 illustrates the $\pi$ mapping which maps a bit-string x to a number x' that has a modular square in a specified narrow mod-N interval. Step 1270 involves computing a Farey interval (discussed in greater detail below) corresponding to the bit-string x. Step 1280 involves computing a bit string at each edge of the Farey interval. Step 1290 involves mapping x to a B-element x' for the Farey interval, where the enumeration in the interval corresponds to x's enumeration between the first and last bit-strings.

The decompression and compression functions utilize the following fact. For a B-element in a "wide" Farey interval, specifying the interval requires fewer bits, but specifying the element's location within the interval requires more bits. Overall, the number of bits "evens out." A detailed description of an exemplary embodiment of the $\pi$ quasi-permutation is given immediately below. With reference to the it definition (19), X=[0,h"] for some parameter h" whose value will be calibrated later. Note that a bit string in $\{0,1\}^n$ can be interpreted as an integer in $[0, 2^{n-1}-1]$ as described above.

Let us make the following assumptions:

Assumptions 1: Let h, h' be integer numbers. In some embodiments, $\|h'-h\| = \lceil 8N^{2/3} \rceil$. Let $J(a_i, b_i)$ be intervals of the Farey partition of order $$k = \left\lceil \frac{2N}{h' - h} \right\rceil$$

for interval [0,N/2). Let $I(a_i, b_i)$ be Farey intervals of the same order k for interval [0,N/2]. Let $J(a_i, b_i)$ be Farey "extended" partition intervals, i.e. including the interval $J(a_f, b_f)$, for the same order k for interval [0,N/2].

LISTING 14-Computing π(x, r) (see FIG. 12):

1. Step 1270 (FIG. 12): Compute $$x \cdot \frac{N}{2h''}$$

to map the interval [0, h"] into [0,N/2], and determine $(a_i, b_i)$ for which the result is in $J(a_i, b_i)$. This step is also illustrated in FIG. 11.

2. Step 1280: Compute $x_{left}$, the smallest integer in [0, h"] with $$x_{right} \cdot \frac{N}{2h''}$$

in $I(a_i, b_i)$, and $x_{right}$, the largest integer in [0, h"] with $$(x_{left} + 1) \cdot \frac{N}{2h''}$$

in $I(a_i, b_i)$.

Step 1290 corresponds to steps 3-5 immediately below.

3. Compute $n_{c+f} = n_c + n_f$, the number of lattice points $P(a_i, b_i)$ in the chest and feet. Compute $n_l$, the VLB lower bound (15) for the number of points in the legs. (The number h" should be chosen so that $n_{c+f} + n_l \geq x_{right} - x_{left}$ as discussed below.)

4. Using Vallée's enumeration or some other enumeration (see Computation Note 1 below), select one lattice point (u, w) (there may be several) that corresponds to $x - x_{left}$. More specifically:

4A. Pick an integer $$c \in \left( (n_{c+f} + n_l) \frac{x - x_{left} - 1}{x_{right} - x_{left}}, (n_{c+f} + n_l) \frac{x - x_{left}}{x_{right} - x_{left}} \right].$$

4B. If $c \leq n_c + n_f$ pick the lattice point (u, w) that has enumeration c in the chest or feet (i.e. when the chest and feet points are enumerated together).

4C. Otherwise, for each v, let $s_v$ be a lower bound for the number of leg lattice points on quasi-horizontal lines 1124 (FIG. 11) with the index at most v. The value $s_v$ can be computed using the VLB value (15). The VLB values can be added to get the $s_v$ estimate, or the inequality (17) can be used to compute $s_v$ as the integral on the right hand side. Compute v such that $s_{v-1} < c - n_{c+f} \leq s_v$. Let $n_v$ be the number of lattice points on the line 1124 with the index v and let $n'_v$ be Vallée's lower-bound estimate (15). Pick an integer $$c \in \left( n_v \frac{c - n_{c+f} - s_{v-1} - 1}{n'_v}, n_v \frac{c - n_{c+f} - s_{v-1}}{n'_v} \right],$$

and set (u, w) to be the c'th point in $P(a_i, b_i)$ on the line.

5. Set $x' = x_0 + u$, where $$x_0 = \left\lfloor \frac{a_i N}{2 b_i} \right\rfloor.$$

Output x'.
END OF LISTING 14.
Computation Note 1.

There are many ways to compute the values $n_c$, $n_f$, and other values used in Listing 14. One example is as follows. Each line 1124 is the set of points of the form:

$$\beta r + \alpha s \qquad (20)$$

where α is a fixed integer and β takes all the real values. For α=0, the corresponding line 1124 (shown as 1124.0 in FIG. 11) passes through the origin (x=w=0), and one can find its intercept 1294 with the vertical line u=0. The line u=0 is the symmetry axis of parabolas 1110, 1120. Using Theorem 4, the corresponding index v=v[0] can be determined. All the other indices v can now be found since they differ from v[0] by an integer, and intercepts 1294 of lines 1124 with the line u=0 can be found since their w values differ by $N/b_i$ from the w value of the line 1124.0 intercept. In particular, the special indices in Definition 1 and the corresponding intercepts 1294 can be determined, and the v values and the w intercept values for all the lines 1124 in the chest and the feet can be found.

For each line 1124 in the chest and feet, the corresponding α value for equation (20) can be determined from the line's intercept 1294, and then the β value for its intercept 1294 can be found. Denote this β value as $\beta_{in}$. The lattice $L(x_0)$ points correspond to the integer values of β. The lattice points can be traversed on that line starting e.g. with $\beta = \lfloor \beta_{in} \rfloor$, i.e. the closest integer to $\beta_{in}$. Each point's coordinates can be plugged into the definition (12) to determine if the point belongs to $P(a_i, b_i)$, and the points in $P(a_i, b_i)$ can thus be counted as part of $n_c$ or $n_f$. When the line is traversed to the right (β, $\beta_{in}$), and a point is encountered outside the parabola 1120 (i.e. $x_0^2 + w + u^2 > h'$), the right-ward traversal can stop. Likewise, when the line is traversed to the left and the point is encountered outside the parabola 1120, the left-ward traversal can stop. The $P(a_i, b_i)$ points can also be enumerated in some other order, for example, starting with the leftmost point on each line 1124 and proceeding to the right. The leftmost point can be found analytically from the corresponding equation (20) and the equations for parabolas 1110, 1120. These embodiments are not limiting.

At step 4B in Listing 14, if $c \leq n_c + n_f$ the $c^{th}$ point can be found by enumerating the chest and feet lines 1124 and enumerating the points on each line. The lines 1124 in the chest and feet can be traversed in some order, for example, staring from the chest in the order of increasing v indices, or in some other order. The points on each line 1124 can be enumerated starting with the corresponding point $\beta = \lfloor \beta_{in} \rfloor$ for that line or in some other order. The invention is not limited to any particular point ordering.

Likewise, at step 4C, when the parameters $n_v$, $n'_v$, c' are determined for some line 1124 in the legs, the c'th point in $P(a_i, b_i)$ on that line can be found by traversing the lattice points starting with the corresponding point $\beta = \lfloor \beta_{in} \rfloor$, for that line or in some other order. In some embodiments, the enumeration order at steps 4B, 4C is a characteristic of the π mapping and is the same order when the $\pi^{-1}$ is computed (as described below in Listing 15). In other embodiments, for a given π mapping, the point enumeration is random to correspond to the r parameter in formulas (19). In still other embodiments, the enumeration is not random but depends on x (for example, on $n_c$, $n_f$ or some other value dependent on x).

In Listing 14, whether or not the enumeration is random, the output x' is a function of random numbers c, c'. In other embodiments, the numbers c, c' are chosen deterministically. For example, they can be chosen as the first integer in each of the corresponding intervals shown at steps 4A, 4C. Alternatively, c can be chosen simply as $x-x_{left}$, and the computation of $x_{right}$ can be omitted. Alternatively, c can be chosen as $x_{right}-x_{left}$. Likewise, c' can be chosen as $c-n_{c+f}-s_{v-1}$. Other random and non-random choices are also possible. The particular scheme of Listing 14 is advantages due to a provable security of the corresponding encryption method under an adaptive chosen message attack with a random oracle if the numbers c, c' are chosen uniformly randomly, as explained below.

End of Computation Note 1.

In computing $\pi(x, r)$, r is used—either deterministically or as a source of random bits–to pick the values of c and c'. Notice that, if we let $S_x = \{x' \in I(a_i, b_i) | \exists r \text{ with } \pi(x, r) = x'\}$, the sets $S_x$'s form a partition of $I(a_i, b_i)$—meaning that each B-element of $I(a_i, b_i)$ has a chance of being selected. Notice also that we pick integers in B quasi-uniformly when we pick x and r uniformly and output $\pi(x, r)$.

In the point enumeration, then, the $n_c + n_f n_{c+f}$ points in the chest and the feet are enumerated 1 through $n_c + n_f$ in some order. The points in the legs are enumerated "roughly," in the sense that multiple points may share the same number. The points in the legs are counted—in particular, $s_v$ is computed—as if they satisfy Valléee's lower bound. This value of $s_v$ can easily be computed by computing the integral in formula (17) of Vallée's estimate for individual lines. The quasi-horizontal lines 1124 in the legs will often contain more points than Vallée's lower bound estimate. In that case, adjacent points on such a line may share a number in the enumeration.

Figure 13:
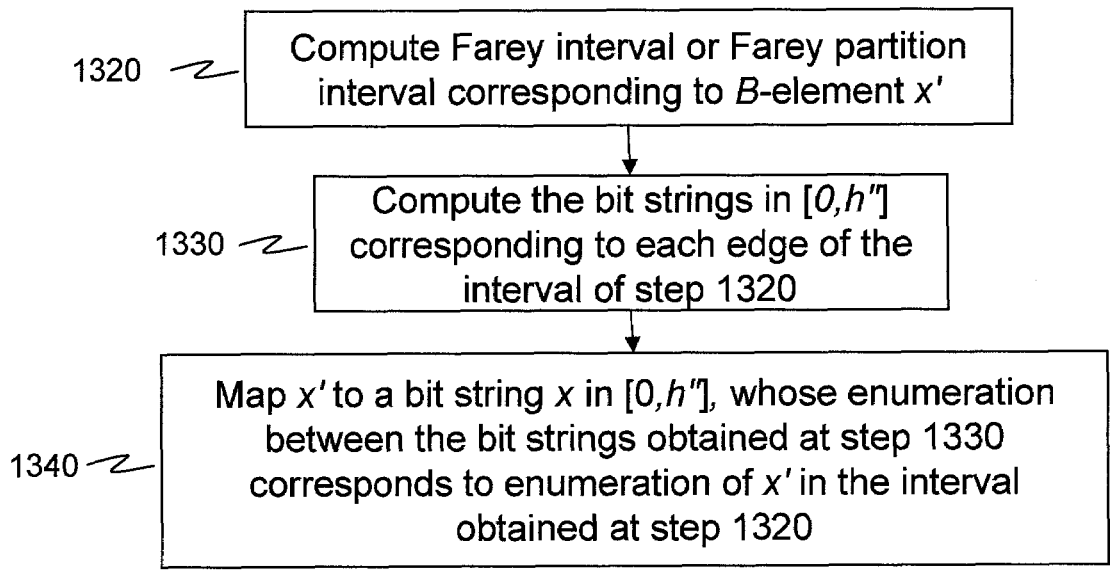
FIG. 13 is a flowchart of a compression method according to some embodiments of the present invention.

FIG. 13 illustrates the inverse mapping $\pi^{-1}$ that maps a B-element x' to a number x in [0,h"]. At step 1320, a Farey interval or a Farey partition interval is determined that corresponds to the B-element x'. At step 1330, bit-strings in [0,h"] a are computed corresponding to each edge of the interval according to the mapping which is the reverse of mapping 1270 of FIG. 11. At step 1340, x' is mapped to the bit string x in [0,h"], whose enumeration between the bit strings obtained at step 1330 corresponds to the enumeration of x" in the interval. Further particulars are discussed below.

Listing 15 below illustrates the particulars when the Farey intervals are used (rather than the Farey partition intervals). Given $x' = \pi(x, r)$, exemplary embodiments of the present invention recover the one or two possible values of x. Suppose Assumptions 1 (above) hold true.

Listing 15—Computing $\pi^{-1}(x', r)$:

1. Step 1320: Determine the Farey interval(s) containing x': $I(a_i, b_i)$ and perhaps $I(a_{i+1}, b_{i+1})$.

2. Step 1330: Compute $x_{left}$, the smallest integer in [0, h"] with $$(x_{left} + 1) \cdot \frac{N}{2h''}$$

in $I(a_i, b_i)$, and $x_{right}$, the largest integer in [0, h"] with $$x_{right} \cdot \frac{N}{2h''}$$

in $I(a_i, b_i)$.

Step 1340 corresponds to steps 3-7 immediately below:

3. Compute $n_{c+f}$, the number of lattice points in the chest and feet of $P(a_i, b_i)$, and $n_l$, the lower bound VLB (15) for the number of points in the legs.

4. From $$x_0 = \left\lfloor \frac{a_i N}{2b_i} \right\rfloor \text{ and } u = x' - x_0,$$

recover the lattice point (u, w). More particularly, since the lattice $L(x_0)$ is generated by vectors $(1, 2x_0)$ and $(0, N)$, it is easy to see that each lattice point (u,w) must satisfy the equation $w = 2x_0 u + \alpha N$ for some integer $\alpha$. Assuming $\|h' - h\| < N$ (which must be true for large N in view of Assumptions 1), there is only one lattice point with a given u between the parabolas 1110, 1120. This lattice point can be computed using the inequality (11) defining the region between the parabolas. For example, one can start with $\alpha = 0$ ($w = 2x_0 u$) and then increment and/or decrement $\alpha$ until the inequality (11) is satisfied.

5. Recover the value of $x - x_{left}$, and thus x, using Vallée's lower bound enumeration or some other enumeration (see Computation Note 1). Specifically:

5A. If (u, w) is the $t^{th}$ point in the chest or feet, set c=t. (The chest and feet points are enumerated together as in Listing 14. See Computation Note 1.)

5B. Otherwise, compute the index v of the line 1124 containing (u, w). Compute the value of c', where (u, w) is the c'th point on the line. Let $n_v$ be the number of lattice points on the line with index v, let $n'_v$ be Vallée's lower-bound estimate VLB (15), and let $s_{v-1}$ be a lower bound for the number of leg lattice points on quasi-horizontal lines 1124 (FIG. 11) with indices less than v. The value $s_{v-1}$ can be computed using the VLB value (15) for each line 1124. These values can be added to get the $s_{v-1}$ estimate, or the inequality (17) can be used to compute $s_{v-1}$ as the integral on the right hand side. Compute the value of c such that $$c' \in \left( n_v \frac{c - n_{c+f} - s_{v-1} - 1}{n'_v}, n_v \frac{c - n_{c+f} - s_{v-1}}{n'_v} \right].$$

6. Compute the value of $x - x_{left}$ such that $$c \in \left( (n_{c+f} + n_l) \frac{x - x_{left} - 1}{x_{right} - x_{left}}, (n_{c+f} + n_l) \frac{x - x_{left}}{x_{right} - x_{left}} \right].$$

Compute $x = x_{left} + (x - x_{left})$.

7. Output x.

End of Listing 15.

See Computation Note 1 above.

If x' is both in $I(a_i, b_i)$ and $I(a_{i+1}, b_{i+1})$, steps 2-6 can be repeated to get the value of x corresponding to $I(a_{i+1}, b_{i+1})$. Thus the above method outputs up to two values of x, exactly one for each Farey interval that contains x'; accordingly, $l_3 = 1$ and $l_4 = 2$. The correct value can be selected by ensuring that the encoded value $x = H(M)$ (FIG. 6, step 210) satisfies some property that will not hold for both outputs $x = \pi^{-1}$. For example, the encoding $x = H(M)$ may contain a checksum of some bits of H(M). Alternatively, there may be some way to resolve the ambiguity of which Farey interval should be chosen at step 1320.

Using a slightly modified approach, it is not difficult to ensure that π(x, r) has a unique inverse. In particular, one can realize a unique inverse by ensuring that x' falls within $J(a_i, b_i)$, which can be ensured by adapting Vallée's quasi-uniform enumeration techniques for $P(a_i, b_i)$ to one of $P_j(a_i, b_i)=\{(u, w) \in L(x_0): x_0+u \in J(a_i, b_i) \text{ and } h \leq x_0^2+w+u^2 \leq h'\}$. In this case, $P_j(a_i, b_i)$ has "uneven" feet and legs, but a quasi-uniform enumeration is nonetheless possible using essentially the same techniques.

Setting Parameters: as mentioned previously, the π quasi-permutation may be more appropriate for the encryption scheme. To set the parameters of the quasi-permutation—in particular, the values of h'−h and the value of h"—one may consider the properties that the quasi-permutation should have to make it as compatible as possible with the encryption scheme. Preferably, π should be uniquely invertible or almost so. As mentioned above, $l_4=2$, but one can achieve $l_4=1$ by considering the intervals $J(a_i, b_i)$ rather than $I(a_i, b_i)$. One would also like each B-element (except perhaps a negligible fraction of them) to have at least one inverse. The reason is that the security proof, in which the security of the encryption scheme is related to factoring, will go through if the B-element drawing method consisting of selecting x with uniform probability and then computing π(x, r) is a "good" drawing method. To get a quasi-uniform drawing method, $l_3$ should be at least 1.

The values of $l_1$ and $l_2$ constrain the size of x's image under the π quasi-permutation. Since each encoded plaintext should be mappable to a B-element, $l_1$ should preferably be at least 1. (However, it is possible to choose parameters such that this is not the case.) The value of $l_2$ should be kept as small as possible given the values of the other parameters. With these considerations in mind, the following computations are presented which illustrate concrete parameters.

Choosing the parameters such that $n_{c+f}+n_l \geq x_{right}-x_{left}$—i.e., such that the lower bound on the number of points in $P(a_i, b_i)$ is greater than the number of bit strings associated to $I(a_i, b_i)$—ensures that 13 is at least 1, as desired. Notice that $$(x_{right} - x_{left} - 1)\frac{N}{2h''} < \frac{h' - h}{2b_i},$$

where the latter term is the diameter of $I(a_i, b_i)$ since h'−h=N/2k. This implies that $$x_{right} - x_{left} - 1 < \frac{h''(h' - h)}{b_i N}.$$

Now, consider the parameters used by Vallée. Vallée considered the case $-h=h'=4N^{2/3}$, so that $h'-h=8N^{2/3}$. For this value of h'−h, Vallée proved a lower bound of $$n_{c+f} + n_l \geq \frac{2(h' - h)^2}{5 b_i N}.$$

Thus, if $$h'' \leq \frac{2(h' - h)}{5},$$

then $x_{right}-x_{left}-1 < n_{c+f}+n_l$. As long as the $n_l$ estimate is an integer, this implies that $x_{right}-x_{left}-1 \leq n_{c+f}+n_l$, as desired. Setting:

$$h'' = \left\lfloor \frac{2(h' - h)}{5} \right\rfloor, \quad (21)$$

$$h' - h = \lceil 8N^{2/3} \rceil$$

one can verify that $l_3$ and $l_1$ are at least 1.

On the other hand, Vallée's upper bounds on the number of points in the chest and the feet allow the value of $l_2$ to be upper bounded. (Recall that $n_l$ is still a lower bound estimate VLB on the number of points in the legs.) Vallée's computations allow $n_{c+f}+n_l$ to be upper bounded by $$\left(1.004 + 0.125 + \frac{4 - \sqrt{5}}{8}\right)\frac{2(h' - h)^2}{b_i N} < \frac{2.7(h' - h)^2}{b_i N}.$$

This allows us to upper bound the number of possible values of c by 8, for the chosen value of h", where c is the number picked at step 4 of LISTING 14. Also, there are at most $\lceil 7/2 \rceil=4$ (see Vallée's Leg Theorem) possible values of c' which is the number picked at step 4 of LISTING 14. Hence $l_2$ is at most 8×4=32. Accordingly, for $h'-h=8N^{2/3}$ and $$h'' = \left\lfloor \frac{2(h' - h)}{5} \right\rfloor,$$

one gets a (1, 32, 1, 2) quasi-permutation.

Since the ciphertexts are in [h, h'] and the plaintexts are in [1, h"] (or [0, h"−1], where $$h'' \approx \frac{2(h' - h)}{5},$$

we can expect only about $\log_2(h'-h)-\log_2 h'' \approx \log_2 5-1$ bits of ciphertext expansion, i.e. at most 3 bits taking rounding into account In terms of performance, computing π(x, r) or $\pi^{-1}(x, r)$ requires only $O(\log^2 N)$ bit operations, which adds little to the complexity of encryption and decryption.

The factor of 5 between h'−h and h" is a consequence of the "looseness" of Vallée's lower bound for $h'-h=8N^{2/3}$. For larger values of h'−h—e.g., such as those considered by Coron—the lower bound becomes a tighter approximation. Thus, for larger values of h'−h, the π quasi-permutation will contribute even less ciphertext expansion to the encryption scheme.

3.2 Mapping B-Elements to Short Strings (The θ Quasi-Permutation)

The θ quasi-permutation is similar to an inverse of the π quasi-permutation. Again, the compression and decompression methods utilize the information known about the distribution of B-elements provided by Vallée's analysis of Farey intervals.

As will be described in more detail in connection with an exemplary embodiment of the present invention utilizing a bandwidth-reduced signature scheme, the θ quasi-permutation allows a regular Rabin partial domain hash signature, such as that proven secure by Coron, to be compressed without loss—i.e., the regular signature can be recovered completely from the compressed signature. The compression method entails no reduction in security. A detailed description of an exemplary embodiment follows.

Suppose the above Assumptions 1 hold true.

LISTING 16-Computing $x=\theta(x',r)$ in $[0,h'']$ for some x' in B (see FIG. 13):

1. Step 1320: Determine $(a_i, b_i)$ for which x' is in $J(a_i, b_i)$.
2. Step 1330: Compute $x_{left}$, the smallest integer in $[0, h'']$ with $$(x_{left} + 1) \cdot \frac{N}{2h''}$$

in $J(a_i, b_i)$, and $x_{right}$, the largest integer in $[0, h'']$ with $$x_{right} \cdot \frac{N}{2h''}$$

in $J(a_i, b_i)$.

Step 1340 corresponds to steps 3-5 immediately below.

3. Compute $n_{c+f}$, the number of lattice points in the chest and feet of $P(a_i, b_i)$, and $n_l$, an upper bound VUB (16) for the number of points in the legs. (We want that $n_{c+f}+n_l \leq x_{right}-x_{left}$.)

4. Using Vallée's enumeration or some other enumeration (see Computation Note 1), select one integer in $x_{right}-x_{left}$ (there may be several) that corresponds to the lattice point (u, w) associated to x'. More specifically:

4A. If (u, w) is the $t^{th}$ point in the chest or feet, set c=t.

4B. Otherwise, let $s_v$ be an upper bound for the number of leg lattice points on quasi-horizontal lines 1124 (FIG. 11) with index at most v. The value $s_v$ can be computed using the VUB value (16) for each line 1124. These values can be added to get the $s_v$ estimate, or the inequality (18) can be used to compute $s_v$ as the expression on the right hand side therein. Compute the index v of the line containing (u, w). Let $n_v$ be the number of lattice points on the line with index v and let $n'_v=s_v-s_{v-1}$ be Vallée's upper-bound estimate VUB (16). Suppose that x' is the $t^{th}$ lattice point on the line. Pick an integer $$c \in \left(n_{c+f} + s_{v-1} + n'_v \frac{t-1}{n_v}, n_{c+f} + s_{v-1} + n'_v \frac{t}{n_v}\right].$$

5. Pick an integer $$c' \in \left((x_{right} + x_{left}) \frac{c-1}{n_{c+f} + n_l}, (x_{right} - x_{left}) \frac{c}{n_{c+f} + n_l}\right].$$

Set $x=x_{left}+c'$.

END OF LISTING 16.

Computation Note 1, including its enumeration discussion, applies to the $\theta$ and $\theta^{-1}$ mappings in the same way as to $\pi$ and $\pi^{-1}$.

In computing $\theta(x', r)$, r is used—either deterministically or as a source of random bits—to pick the values of c and c'. Given $x=\theta(x', r)$ in $[0,h'']$, one can recover the value of x' in B as follows:

LISTING 17-Computing $\theta^{-1}(x)$ (FIG. 12):
1. Step 1270: Determine $(a_i, b_i)$ for which $$x \cdot \frac{N}{2h''}$$

is in $J(a_i, b_i)$.

2. Step 1280: Compute $x_{left}$, the smallest integer in $[0,h'']$ with $$(x_{left} + 1) \cdot \frac{N}{2h''}$$

in $J(a_i, b_i)$, and $x_{right}$, the largest integer in $[0,h'']$ with $$x_{right} \cdot \frac{N}{2h''}$$

in $J(a_i, b_i)$.

Step 1290 (steps 3-5 immediately below):

3. Compute $n_{c+f}$, the number of lattice points in the chest and feet of $P(a_i, b_i)$, and $n_l$, an upper bound VUB (16) for the number of points in the legs.

4. Compute $c'=x-x_{left}$. From c' and $n_{c+f}+n_l$, compute the value c such that:

$$c' \in \left((x_{right} + x_{left}) \frac{c-1}{n_{c+f} + n_l}, (x_{right} - x_{left}) \frac{c}{n_{c+f} + n_l}\right].$$

If $c \leq n_{c+f}$, let (u, w) be the $c^{th}$ point in the chest or feet. Otherwise, compute the index v such that $c \in (n_{c+f}+s_{v-1}, n_{c+f}+s_v]$, where $s_v$'s are defined as in Listing 16, step 4B. Also compute the value of t (defined as in Listing 16), and let (u, w) be the $t^{th}$ point on the quasi-horizontal line 1124 with index v.

5. Set $$x' = \theta^{-1}(x) = \left\lfloor \frac{a_i N}{2b_i} \right\rfloor + u.$$

END OF LISTING 17.

Computation Note 1, including its enumeration discussion, applies to Listing 16.

Setting Parameters: the $\theta$ quasi-permutation is perhaps more appropriate for signature schemes; so, in choosing the values of h'−h and the value of h'', one must consider the properties that the quasi-permutation should include to make it as useful as possible for signature schemes. For instance, $\theta$ should be uniquely invertible or almost so. Unique-invertibility is not necessary however if it is possible to recognize the correct H(M) value at step 510 of FIG. 9 from multiple candidates, or to otherwise recognize the verification at step 520. In one embodiment, $l_3$ and $l_4$ both equal 1—i.e., each bit string x has exactly one B-element x' as its inverse. It is appropriate that $l_1$ is at least one—i.e., each B-element should have at least one short bit string as its compression. As before, $l_2$ should be kept as small as possible given the values of the other parameters. With these considerations in mind, the following computations illustrate concrete parameters.

Choosing the parameters such that $n_{c+f}+n_l \leq x_{right}-x_{left}$—i.e., such that the upper bound on the number of points in $P(a_i, b_i)$ is less than the number of bit strings associated to $J(a_i, b_i)$ ensures that there is at least one bit string uniquely associated to each B-element. Notice that $(x_{right} - x_{left} + 1)$ $$\frac{N}{2h''} > \frac{h'-h}{2b_i},$$

where the latter term is the diameter of $I(a_i, b_i)$, which is at least the diameter of $J(a_i, b_i)$. This implies that $$x_{right} - x_{left} + 1 > \frac{h''(h'-h)}{b_i N}.$$

Now, consider the parameters used by Coron. Coron considered the case where $$h' - h = N^{\frac{2}{3}+\varepsilon}, \quad k = N^{\frac{1}{3}-\frac{\varepsilon}{13}}, \text{ and } N^{\frac{1}{3}-\frac{4\varepsilon}{13}} \leq b_i \leq k.$$

For these values, Coron proved an upper bound of $$n_{c+f} + n_l \leq \frac{(h'-h)j_i}{N}(1 + 4N^{-\frac{3\varepsilon}{13}}),$$

where $j_i$ is the number of integers in $J(a_i, b_i)$. Thus, if $$h'' \geq b_i j_i (1 + 4N^{-\frac{3\varepsilon}{13}}),$$

then $x_{right} - x_{left} + 1 > n_{c+f} + n_l$. As long as the $n_l$ estimate is an integer, $x_{right} - x_{left} \geq n_{c+f} + n_l$, as desired. Accordingly, we may set $$h'' = \max\left[b_i j_i (1 + 4N^{-\frac{3\varepsilon}{13}})\right]$$

where the maximum is taken over all i.

On the other hand, Coron also proves the lower bound $$n_{c+f} + n_l \geq \frac{(h'-h)j_i}{N}(1 - 4N^{-\frac{3\varepsilon}{13}}).$$

This allows us to upper bound the number of possible values for c' to about $$\left[(1 + 4N^{-\frac{3\varepsilon}{13}})/(1 - 4N^{-\frac{3\varepsilon}{13}})\right],$$

which will be at most 2 for typical values of N and $\varepsilon$. Also, the number of possible values for c is upper bounded by about $[(j_i/b_i)/(j_i/b_i)]$, which will also be at most 2 for Coron's parameters. Thus, $l_2$ is at most $2 \cdot 2 = 4$, and one gets a (1, 4, 1, 1) quasi-permutation. However, only a negligible fraction of the B-elements will have more than one image.

4. Encryption/Decryption Schemes

Figure 6:
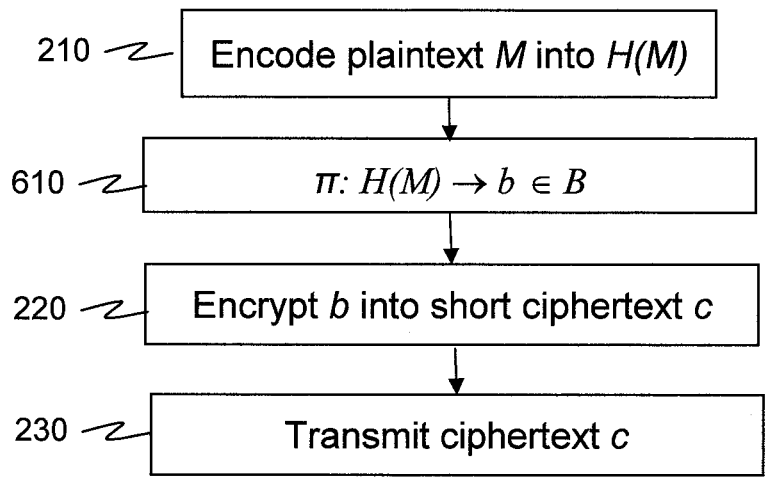
FIG. 6 is a flowchart of an encryption method according to some embodiments of the present invention.
Figure 7:
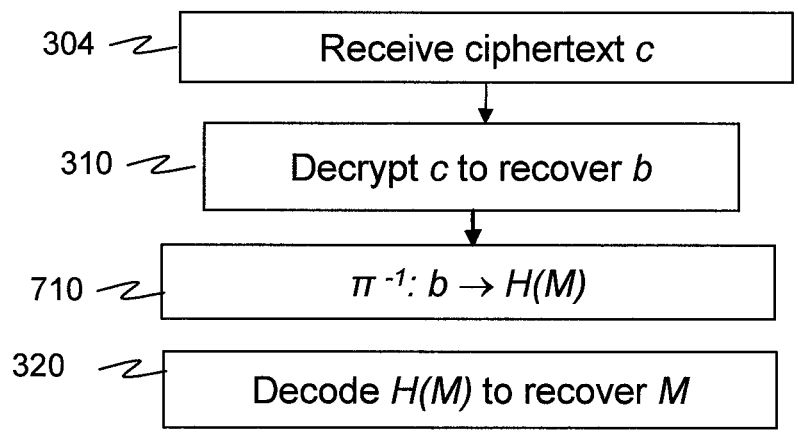
FIG. 7 is a flowchart of a decryption method according to some embodiments of the present invention.

The $\pi$ transformation of the present invention can be used in the method of FIG. 6 to improve Rabin-based encryption schemes, such as Rabin-OAEP+ (as described above), by allowing a reduction in the size of the ciphertext.

Below, the expression $\pi_{N,h,h'}$ denotes a mapping $\pi$ into the set $B^2_{N,h,h'}$, and $\theta_{N,h,h'}$ denotes a mapping $\theta$ from the set $B^2_{N,h,h'}$.

Listing 18—Encryption (FIG. 6):
1. Step 210: Compute x=H(M), an encoding of the message M.
2. Step 610: Compute $x' = \pi_{N,h,h'}(X, r) \in [0, N/2]$.
3. Step 220: Compute $y = x'^2 \pmod{N}$. Here the letter y is used for ciphertext instead of c to avoid confusion with other uses of c in this document.
4. Step 230: Output y as the ciphertext.
End of Listing 18.

Listing 19—Decryption (FIG. 7):
1. Step 310: Compute each $x' \in [0, N/2]$ such that $x'^2 = y \pmod{N}$. The number x' is shown as b in FIG. 7. There is at least one such x' in $[0, N/2]$ because if $x'^2 = y \pmod{N}$ and x' is not in $[0, N/2]$, then x' can be set to N−x', and this new x' value will be in $[0, N/2]$ and will satisfy $x'^2 = y \pmod{N}$.
2. Step 320: Compute $x = \pi_{N,h,h'}^{-1}(x')$. There may be several such x values. These values correspond to H(M) in FIG. 7.
3. Step 330: Undo the message encoding, and confirm that the message M is encoded correctly.
4. If M is not encoded correctly, try another value of x'; if all values of x' have been tried, indicate that decryption has failed.
End of Listing 19.

It can be shown that the Rabin encryption scheme with the $\pi$ mapping, according to Listings 14, 15, 18, 19, is as secure as without the $\pi$ mapping under the existential unforgeability model with an adaptive chosen message attack with a random oracle. See Craig Gentry, *How to compress Rabin Ciphertexts and Signatures (and More)*, Proc. Of Crypto 2004, M. Franklin (Ed.), Lecture Notes in Computer Science 3152, pp. 179-200. Springer, 2004, incorporated herein by reference.

Notice that the $\pi$ quasi-permutation depends on the particular values of N, h and h'. Thus, in some sense, h and h' are part of the public key, which the sender needs to perform the encryption. Various encoding schemes well-known in the art that can be used with RSA or Rabin encryption can also be used in the bandwidth-reduced encryption scheme of the present invention. Below, a more detailed bandwidth-reduced encryption scheme is provided, which parallels the description of Rabin-OAEP+ in Listings 5 and 6 above. As before, the message encoding utilizes the hash functions defined above by formulas (1). Whereas in the non-bandwidth-reduced Rabin-OAEP+ (Listings 5 and 6), it was the case that $N \approx 2^n$, it is appropriate in the bandwidth-reduced encryption scheme of the present invention to set $$\frac{16}{5}N^{2/3} \approx 2^n,$$

in accordance with the value of h" for Vallée's parameters as shown in formulas (21). In some embodiments, h'−h is about $8N^{2/3}$, as in Vallée's parameters. Of course one can allow n to be larger—e.g., up to $\log_2 N$—but such is not mandatory unless the encoded plaintext must be larger than $$\log_2\left(\frac{16}{5}N^{2/3}\right).$$

To encrypt a message M∈{0, 1}$^m$, the sender performs the following operations (see FIG. 6):

Listing 20—Encryption.
Step 210 of FIG. 6 corresponds to steps 1-3 immediately below:
1. Pick a random r E {0, 1}$^{k_0}$.
2. Set s←(G(r)⊕M)||H'(r||M) and t←H(s)⊕r.
3. Set x←s||t, slit, an n-bit string.
4. Step 610: Compute x'=π(x, r)∈[0,N/2].
5. Step 220: Compute the ciphertext c←x'$^2$ (mod N).
End of Listing 20.

Notice that, since x' is an integer with a modular square in a very narrow range (i.e., in [h, h']), only the ⌈log$_2$(h'−h)⌉ least significant bits of c actually need to be transmitted, making the ciphertext "short." For h'−h=8N$^{2/3}$, the ciphertext is about $$3 + \frac{2}{3}$$

log$_2$ N bits.

To decrypt, the recipient performs the following steps (see FIG. 7):

Listing 21—Decryption.
1. Step 310: Compute the modular square roots ±x$_1$' and ±x$_2$'of c. At least one of ±x$_1$', and at least one of ±x$_2$', will be in [0, N/2]. Without loss of generality, it can be assumed that x$_1$', x$_2$' are in [0,N/2].
2. For each candidate x$_i$' (i=1, 2):
   2A. Step 710: Compute x$_i$=π$^{-1}$(x$_i$').
   3A. Step 320: Parse x$_i$ into s$_i$||t$_i$ for s$_i$∈{0,1}$^{6m+k_1}$ and t$_i$∈{0, 1}$^{k_0}$, and then parse s$_i$ into s$_i$'||s$_i$" for s$_i$'∈{0, 1}$^m$ and s$_i$"{0, 1}$^{k_1}$. For each i, compute r$_i$←t$_i$⊕H(s$_i$) and M$_i$←s$_i$'⊕G(r$_i$), and tests whether s$_i$"=H'(r$_i$||M$_i$). If there is a unique i for which the condition is satisfied, output M$_i$ as the correct plaintext; otherwise, indicate a decryption failure.
End of Listing 21.

To sketch the proof of security, one can prove (for instance, using a "random oracle model") that breaking the bandwidth-reduced encryption scheme above is as hard as factoring the modulus N. For instance, suppose that there is an algorithm A that breaks the encryption scheme in time t$_A$ and with advantage ϵ$_A$, where the advantage is defined as the probability (minus ½) that A can correctly guess which of two plaintexts of its choice, M$_0$ and M$_1$, are encrypted by a particular ciphertext. Then, one can construct a second algorithm B that can factor N, by using knowledge gained through its interaction with A. For instance, consider the following "game."

The challenger gives B the modulus N to factor. B claims N as its public key, and allows A, in Phase 1, to request the decryption of ciphertext messages c of A's choice. Now, B does not know the secret key, so B cannot actually decrypt; however, B controls the output of the cryptographic hash functions G, H and H' (1). This is a random oracle model; a hash function is treated as an oracle that an entity in the "game" may control. A queries B for the hash function values for a message M of A's choice. If B has received this query before for the same message M, B returns the same has function values as before. If not, B generates hash function values randomly. A uses the hash function values to encrypt M into a ciphertext c, and requests B to decrypt c.

Since B controls the hash functions, and since A cannot create a validly encoded ciphertext without making hash queries (except with a negligible probability), B gets to "see" A's inputs M into the hash functions, including (e.g.) the value of M that A inputs into H'. Using this knowledge, B can respond to A's decryption queries correctly with an overwhelmingly high probability. At the end of Phase 1, A selects the messages M$_0$ and M$_1$ on which it wishes to be tested, B randomly selects a bit b∈{0, 1}, and sends back a ciphertext c ("challenge ciphertext") encrypting M$_b$. B cleverly "rigs" this ciphertext, using its control over the hash functions, so that it knows a modular square root x$_1$' of c. In "Phase 2," A can request additional ciphertexts to be decrypted, other than the challenge ciphertext. Ultimately A outputs a guess b'∈{0, 1}, and it wins the game if b=b'. A will have, at best, a negligible advantage unless it makes additional hash queries, again allowing B to "see" the input to these hash functions.

If A does indeed compute a modular square root x$_2$' of c, there is a chance that x$_2$'≠±x$_1$', so that gcd(N, x'$_2$−x$_1$') gives a nontrivial factor of N. Indeed, given that the drawing method consisting of computing x and r uniformly (the hash functions are assumed to give uniform output for x), and then computing x'=π(x, r), is a quasi-uniform drawing method, meaning that it is highly improbable for A to guess which modular square root B knows. Therefore, A will often guess wrong, and its hash queries have a good chance (at least a ½0 chance, given Vallées values $$l_1 = \frac{1}{5} \text{ and } l_2 = 4$$

for the quasi-uniform drawing method) of giving B the information it needs to compute a nontrivial factor of N.

5. Signature Scheme

The θ transformation of the present invention can be used to improve Rabin-based signature schemes, such as the partial domain hash signature scheme proven secure by Coron, by allowing the signatures to be compressed without loss. The basic approach is as follows:

Listing 22—Signing (See Also FIG. 8):
1. Step 410 of FIG. 8: Compute y∈[h, h'], an encoding of message M. Step 420 of FIG. 8 corresponds to steps 2 and 3 immediately below.
2. Compute e∈{−2, −1, 1, 2} such that ey is a square modulo N, and compute ey(mod N). Multiplication by e is done because y may have no square roots modulo N, but one of −2*y, −y, y, 2*y will always have a square root modulo N (assuming N is a product of two primes).
3. Compute x'∈[0, N/2] such that x'$^2$≡ey(mod N). The "regular" signature is (x', e).
4. Step 810 of FIG. 8: Compute x=θ$_{N,eh,eh'}$(x', r) if e is positive, or x=θ$_{N,eh',eh}$(x', r) if e is negative. The compressed signature is (x, e).
End of Listing 22.

Listing 23—Verification (see FIG. 9):
1. Step 910 (FIG. 9): Compute x'=θ$_{N,eh,eh'}^{-1}$(x) if e is positive, or x'=θ$_{N,eh',eh}^{-1}$(x) if e is negative.
2. Step 510: Compute y=H(M)/e(mod N).
3. Step 520: Confirm that y∈[h, h'] and is an encoding of message M.
End of Listing 23.

Notice that the θ quasi-permutation depends on the particular values of N, h, h' and e. Thus, in some sense, h and h' are part of the public key, which the verifier needs to verify the signature. Various encoding schemes well-known in the art that can be used with RSA or Rabin signatures can also be used in the bandwidth-reduced signature scheme of the present invention, and vice-versa. The value of e can be expressed in 2 bits. Different values for e can be used, but it is appropriate to keep the magnitude of e small.

It can be shown that the Rabin signature scheme with the θ mapping, according to Listings 16, 17, 22, 23, is as secure as without the θ mapping under the existential unforgeability model with an adaptive chosen message attack with a random oracle. See the aforementioned article by Craig Gentry, *How to compress Rabin Ciphertexts and Signatures (and More)*.

Below, a more detailed bandwidth-reduced signature scheme is provided, which parallels the description of the full domain hash signature scheme previously described (see Listings 7 and 8). It uses a particular encoding scheme that allows message recovery. As before, it uses the cryptographic hash functions given by formulas (1) above. Whereas, in the non-bandwidth-reduced signature scheme (Listings 7 and 8), it was the case that $N \approx 2^n$, for the bandwidth-reduced signature scheme, it is desirable to have $$N^{\frac{2}{3}+\varepsilon} \approx 2^n,$$

in accordance with Coron's parameters. Again, one can set n to be larger than $$\left(\frac{2}{3}+\varepsilon\right)\log_2$$

N bits, but is not desirable unless, for some reason, the encoded message must be longer than $$\left(\frac{2}{3}+\varepsilon\right)$$

Generating N such that N=pq for primes p≡3(mod 8) and q≡7(mod 8), the signer performs the following operations:

Listing 24—Signing (FIG. 8):
Encoding step 410 in FIG. 8:
1. Pick a random r∈$\{0, 1\}^{k_0}$.
2. Set s"←H'(r∥M), s'←G(s")⊕M and t∴H(s")⊕r.
3. Set y←s'∥s"∥t, an n-bit integer.
Signing step 420 in FIG. 8:
4. Compute $u_q \leftarrow y^{(q+1)/4}$(mod q).
5. Set $e_y \leftarrow 1$ if $u_q^2 \equiv y$(mod q); else set $e_y \leftarrow -1$.
6. Compute $u_p \leftarrow (e_y y)^{(p+1)/4}$(mod p).
7. Set $f_y \leftarrow -1$ if $u_p^2 \equiv e_y y$(mod p); else set $f_y \leftarrow 2$.
8. Compute $v_q \leftarrow f_y^{(3q-5)/4} u_q$(mod q) and $v_p \leftarrow f_y^{(3p-5)/4} u_p$(mod p).
9. Compute $w \leftarrow v_q + q(q^{p-2}(v_p - v_q) \mod p)$.
10. Set x'←w if 2w<N; else set x' N−w.
Short signature generation (step 810 in FIG. 8):
11. Compute $x = \theta_{N,eh,eh'}(x', r)$ if e is positive, or $x = \theta_{N,eh',eh}(x', r')$ if e is negative.
12. Output the signature $(e_y, f_y, r, x)$.
End of Listing 24.

Again, the values of $2^{(3q-5)/4}$(mod q), $2^{(3p-5)/4}$(mod p) and $q^{p-2}$(mod p) can be precomputed so that steps 8 and 9 add little to the signing time.

Listing 25—Verification (FIG. 9):
1. Step 910: Compute $x'_{tmp} = \theta_{N,eh,eh'}^{-1}(x)$ if e is positive, or $x_{tmp}' = \theta_{N,eh',eh}^{-1}(x)$ if e is negative.

2. Steps 510, 520: Compute $y_{tmp} \leftarrow e_y f_y x_{tmp}'^2$(mod N), confirm that $y_{tmp}$ is n bits, parse $y_{tmp}$ into $s_{tmp}'\|s_{tmp}"\|t_{tmp}$ compute $M_{tmp} \leftarrow G(s_{tmp}") \oplus s_{tmp}'$ and $r_{tmp} \leftarrow H(s_{tmp}") \oplus t_{tmp}$, and confirm that $s_{tmp}" = H(r_{tmp} \| M_{tmp})$.
End of Listing 25.

Notice that the message M is recovered during the verification process. Notice also that the compression θ (step 11 of LISTING 24) comes into play only at the end of the signing process, after the "regular" Rabin signature $(e_y, f_y, x')$ has been produced.

The proof of security follows easily from the proof of security for the "regular" partial domain hash signature scheme, as provided by Coron. It is clear that if an attacker A could forge in the bandwidth-reduced scheme, then a second attacker B against the non-bandwidth-reduced scheme could simply apply $\theta^{-1}$ to A's forgery to get a forgery in the non-bandwidth-reduced scheme. B can easily respond to A's signature queries in the simulation, by relaying the signature queries to the challenger, and then applying θ to the challenger's responses before relaying them to A.

6. Signcryption Scheme

In a signcryption scheme according to some embodiments of the present invention, a sender simultaneously signs a message with its own secret key and encrypts it with the recipient's public key, preferably in such a way that the signcryption transmission consumes less bandwidth than if the sender had sent a signature and a ciphertext separately. The recipient decrypts the signcryption with its secret key, and verifies the sender's signature with the sender's public key. Denote the sender's public modulus by $N_A$ or N(A), and the sender's h, h' parameters by $h_A$ and $h'_A$ respectively, or by h(A) and h'(A). Denote the recipient's public modulus by $N_B$ or N(B) and the recipient's h, h' parameters by $h_B$ and $h'_B$ respectively, or by h(B) and h'(B). One embodiment is as follows (see FIGS. 6, 8 and 14):

Listing 26—Signcryption (FIG. 14):
1. Step 410 of FIG. 14 (encoding): Compute y∈$[h_A, h'_A]$, an encoding of message M.
Step 420 (steps 2, 3 immediately below):
2. Compute e∈$\{-2, -1, 1, 2\}$ such that ey is a square modulo $N_A$.
3. Compute x'∈$[0, N_A/2]$ such that $x'^2 \equiv ey$(mod $N_A$).
4. Step 810: Compute short signature $x = \theta_{N_A,eh_A,eh_A'}(x',r)$ if e is positive, or $x = \theta_{N_A,eh_A',eh_A}(x',r)$ if e is negative.
5. Step 1410: Compute $x" = \theta_{N_B,eh_B,eh_B'}^{-1}(x)$ if e is positive, or $x" = \theta_{N_B,eh_B',eh_B}^{-1}(x)$ if e is negative, with x"∈$[0, N/2]$.
6. Step 1420: Compute $c = x"^2$(mod $N_B$). The signcryption consists of e and c or e and an abbreviation of c (an abbreviation of c is a number that can be expressed with fewer bits than c and from which c can be determined; examples include c−h, or some number of the least significant bits of c).
End of Listing 26.

Notice that the θ quasi-permutation depends on the particular values of N, e and the values of h and h', which may be different for users A and B. Thus, in some embodiments, h and h' are part of the public key, which the recipient needs to verify the signature and decrypt the message. Although different signers can use different values for h and h', it is desirable that they be the same for simplicity. Various encoding schemes are well-known in the art; one scheme is described below in detail. The value of e can be expressed in 2 bits. Different values for e can be used, but it is desirable to keep the magnitude of e small. The "abbreviation of c" (e.g., c−h, which can be expressed with $\lceil \log_2(h'-h) \rceil$ bits) can be used in combination with h and h' to recover the complete value of c; hence the signcryption is "short."

Figure 15:
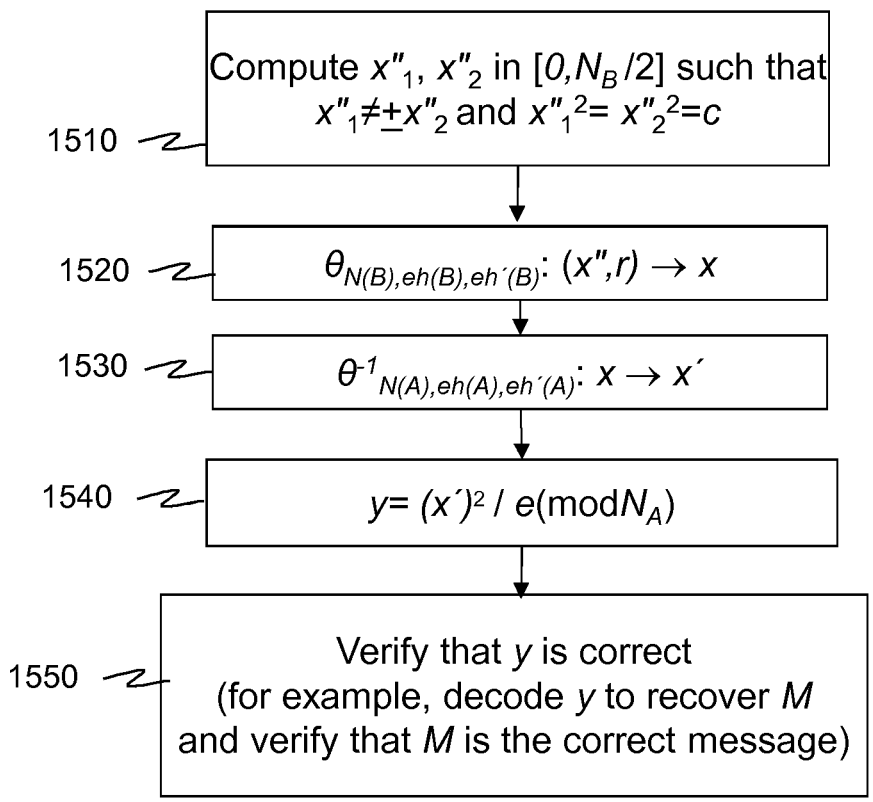
FIG. 15 is a flowchart of a signcryption verification method according to some embodiments of the present invention.

Listing 27—Unsigncryption (see FIG. 15):

1. Step 1510 (decryption): Compute the two values of $x'' \in [0, N_B/2]$ such that $x''^2 \equiv c \pmod{N_B}$.

2. Step 1520: Compute $x = \theta_{N_B, eh_B, eh_B}(x'', r)$ if e is positive, or $x = \theta_{N_B, eh_B', eh_B}(x'', r)$ if e is negative.

3. Step 1530: Compute $x' = \theta_{N_A, eh_A, eh_A}^{-1}(x)$ if e is positive, or $x' = \theta_{N_A, eh_A', eh_A}^{-1}(x)$ if e is negative.

4. Step 1540: Compute $y = x'^2/e \pmod{N_A}$.

5. Step 1550: Undo the message encoding to recover M, and confirm that the message M is encoded correctly. If M is not encoded correctly, try the other value of x''; if both values of x'' have been tried, indicate that the decryption has failed.

End of Listing 27.

Figure 14:
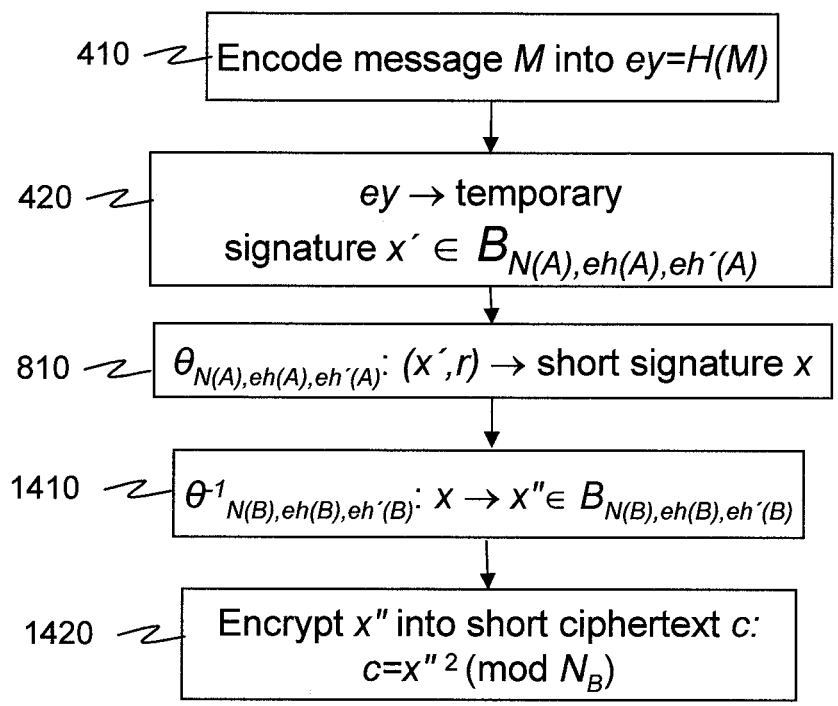
FIG. 14 is a flowchart of a signcryption method according to some embodiments of the present invention.

In unsigncryption, the unsigncrypter does not know the particular value of r used by the signcrypter in the computation of θ at step 810 of FIG. 14; however, for the desired choice of parameters for the θ quasi-permutation, only a negligible fraction of B-elements will have more than one image, so the output is likely unique (independent of r). However, if desired, the signcrypter can send a few extra bits indicating which value of r it used.

An exemplary encoding for step 410 of FIG. 14 is as follows. Let m, $k_0$, $k_1$ be security parameters. The quantities $2^{-k_0}$ and $2^{-k_1}$ should be negligible, but this is not necessary. Let $n = m + k_0 + k_1$. Desirably, the moduli $N_A$ and $N_B$ have about the same number of bits, and, as in the bandwidth-reduced signature scheme, $$N_A^{\frac{3}{3}+\varepsilon} \approx 2^n.$$

If $N_A$ and $N_B$ differ in size, one can set n such that $$\max\left\{N_A^{\frac{2}{3}+\varepsilon}, N_B^{\frac{2}{3}+\varepsilon}\right\} \approx 2^n.$$

Again, one can set n to be even larger, but such is not optimal. Define the following cryptographic hash functions:

$$G: \{0,1\}^{k_0} \to \{0,1\}^{m+k_1},$$

$$H: \{0,1\}^{m+k_1} \to \{0,1\}^{k_0}.$$

This H function (an intermediate value for computation of the message encoding) should not be confused with the H(M) function shown at step 410 of FIG. 14 and representing the final encoded message.

To compute y at step 410 of FIG. 14, where y is an encoding of message $M \in \{0,1\}^m$, the signcrypter:

1. Picks a random $r \in \{0,1\}^{k_1}$.
2. Sets $t = H(r\|M)$ and $s = (r\|M) \oplus + G(t)$.
3. Sets $y = s\|t$.

At step 1550 (FIG. 15), the unsigncrypter parses y into s and t, recovers r and M from $s \oplus G(t)$, and confirms that $t = H(r\|M)$. The security proof is essentially an amalgam of the security proofs for the encryption and signature schemes, previously described. Furthermore, the number theoretic approach to computing modular square roots described above in connection with the bandwidth-reduced signature scheme could be used with the signcryption/unsigncryption.

In some signcryption embodiments, the signature and encryption order is reversed, i.e. the sender first encrypts the message with the recipient's public key and then signs the message with the sender's private key. The recipient verifies the signature and recovers the encrypted message, then decrypts the message. The techniques similar to those of Listings 26, 27 can be used, with the appropriate changes in the operation order.

7. Aggregate Signature Scheme

In the aggregate signature scheme according to some embodiments of the present invention, a set of signers $\{S_1, \ldots, S_z\}$ with respective public key moduli $\{N_1, \ldots, N_z\}$ signs the respective messages $\{M_1, \ldots, M_z\}$ in such a way that their aggregated signature—i.e., the bit string needed to verify that each $S_i$ has signed $M_i$—is "short," optimally consuming less bandwidth than if each signer signed its respective message separately. In some embodiments of the present invention, the messages are signed in sequence, meaning that signer $S_i$ produces signature $s_i$ on $M_i$ after receiving $s_{i-1}$ from $S_{i-1}$. In some embodiments, the $N_i$ all have approximately the same bit length. The considerations regarding the bit-length of the $N_i$ are essentially the same as previously described in relation to the signcryption embodiment of the present invention.

Each $s_{i-1}$ is a compressed (by $\theta_{N_{i-1},h,h'}$) representation of an element of $B^2_{N_{i-1},h,h'}$ (note step 810 of FIG. 8), and $s_i$ is essentially computed (steps 420, 810) as a compressed square root modulo $N_i$ of a number in [h, h']. That number depends on $s_{i-1}$ and $M_i$. (From here on, although different signers can use different values of h and h', this is not indicated in the notation, for sake of convenience). The aggregate signature is verified with the public keys $\{N_1, \ldots, N_z\}$. More concretely, the approach is as follows. Let f be a function that will be specified later. $N_i$ will also be denoted as N(i). The $i^{th}$ signer performs the following operations.

LISTING 28-Aggregate Signing (see FIG. 8):

0. Set $s_0 = d$, where d is a pre-defined fixed value (can be any value).

1. For i=1 to i=z, do the following:

1A. Step 410: Compute $y_i = f(s_{i-1}, N_i, M_i, \ldots, N_1, M_1) \in [h, h']$.

Step 420 (steps 1B and 1C immediately below):

1B. Compute $e_i = e(i) \in \{-2, -1, 1, 2\}$ such that $e_i y_i$ is a square modulo $N_i$. Compute $H(M) = e_i y_i \pmod{N_i}$.

1C. Step 420: Compute $s'_i \in [0, N_i/2]$ such that $s'^2_i \equiv e_i y_i \pmod{N_i}$.

1D. Step 810: Compute $s_i = \theta_{N(i), e(i)h, e(i)h}(s'_i, r)$ if $e_i$ is positive, or $s_i = \theta_{N(i), e(i)h', e(i)h}(s'_i, r)$ if $e_i$ is negative.

2. Output the aggregate signature $(s_1, e_1, \ldots s_z, e_z)$.

END OF LISTING 28.

Notice that the $i^{th}$ signer receives the value of $s_{i-1}$—the $(i-1)^{th}$ signer's result after aggregating its own signature—before producing $s_i$. Different signers can use different values for h and h', as in the signcryption scheme, but it is desirable that they be the same for simplicity. The function ƒ will be explained after outlining verification as used by the present invention.

Listing 29—Verification (see FIG. 9):

1. For i=z to i=1, do the following:

1A. Step 910: Compute $s'_i = \theta^{-1}_{N(i), e(i)h, e(i)h}(s_i)$ if $e_i$ is positive, or $s'_i = \theta_{N(i), e(i)h', e(i)h}(s_i)$ if $e_i$ is negative 1B. Step 510: Compute $y_i = S'^{2s/e}_i \pmod{N_i}$.

1C. Step 520: Compute $s_{i-1}$ from $y_i = j(s_{i-1}, N_i, M_i, \ldots, N_1, M_1)$.

2. Step 520: Confirm that so, as computed at step 1B-2, equals d.

End of Listing 29.

The function $f$ should be both efficiently computable in the aggregate signing process, and efficiently invertible in the verification process—invertible in the sense that sirs should be derivable from $f(s_{i-1}, N_i, M_i, \ldots, N_1, M_1)$ and the values of $N_i, M_i, \ldots, N_1, M_1$. One candidate for such a function is $f(s_{i-1}, N_i, M_i, \ldots, N_1, M_1) = s_{i-1} \cdot H_i(N_i, M_i, \ldots, N_1, M_1)$, where * is some easily invertible binary operation such as addition or XOR.

There may be a problem in proving the security of this scheme. One reason may be that there are many possible values for the aggregate signature component $s_{i-1}$ for any fixed set of keys and messages $(N_i, M_i, \ldots, N_1, M_1)$, and the simulator (i.e., algorithm B in the language of the Encryption section 4) cannot possibly "rig" the single value of $H_i(N_i, M_i, \ldots, N_1, M_1)$ in such a way that it can respond to the attacker's signature queries concerning $s_i$ for all possible values of $s_{i-1}$. Here $H_i$ is some hash function with values in the set of integers modulo $N_i$.

To address this problem, a different approach for computing f may be used, in which one computes $f(s_{i-1}, N_i, M_i, \ldots, N_1, M_1) = E_{k_i}(s_{i-1})$, where E is a symmetric encryption scheme, and the symmetric encryption key $k_i$ is computed as $k_i = H_i(N_i, M_i)$ (or $k_i = H_i(N_i, M_i, \ldots, N_1, M_1)$ if desired) for some hash function $H_i$. One can easily see that f is invertible: given $c = E_{k_i}(s_{i-1})$, $N_i$ and $M_i$, one can compute $k_i = H_i(N_i, M_1)$ and then $s_{i-1} = E_{k_i}^{-1}(c)$, where $E_{k_i}^{-1}$ is symmetric decryption under key $k_i$. This security proof does not use the random oracle model, in which one pretends that the cryptographic hash functions act like oracles that give back random responses; instead, it uses the ideal cipher model, in which one pretends that ciphers (symmetric encryption schemes) act like oracles that give back random ciphertexts for a given key/message pair. See M. Bellare, D. Pointcheval, and P. Rogaway, "Authenticated Key Exchange Secure Against Dictionary Attacks," in Proc. Of Eurocrypt 2000, B. Preneel (Ed.), Lecture Notes in Computer Science 1807, pp. 139-155. Springer-Verlag, 2000, incorporated herein by reference.

The ideal cipher model allows the simulator to make its query responses dependent not only on the keys and messages, but also on $s_{i-1}$, allowing the simulator more freedom to "rig" its responses. Optimally, the symmetric encryption scheme E can encrypt strings of $s_{i-1}$'s length—i.e., about $(2/3+\epsilon)\log_2 N_i$ bits—without any ciphertext expansion, so that the size of the aggregate signature does not grow significantly as more and more signatures are aggregated.

Figure 8:
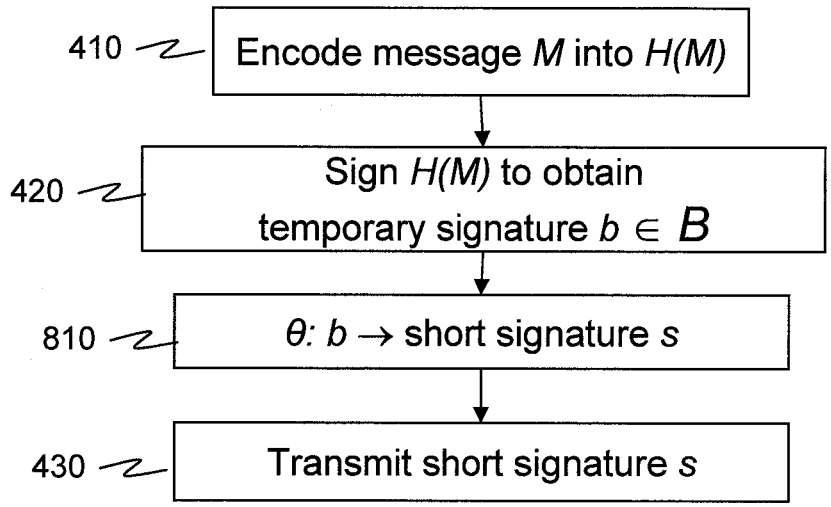
FIG. 8 is a flowchart of a signature method according to some embodiments of the present invention.
Figure 9:
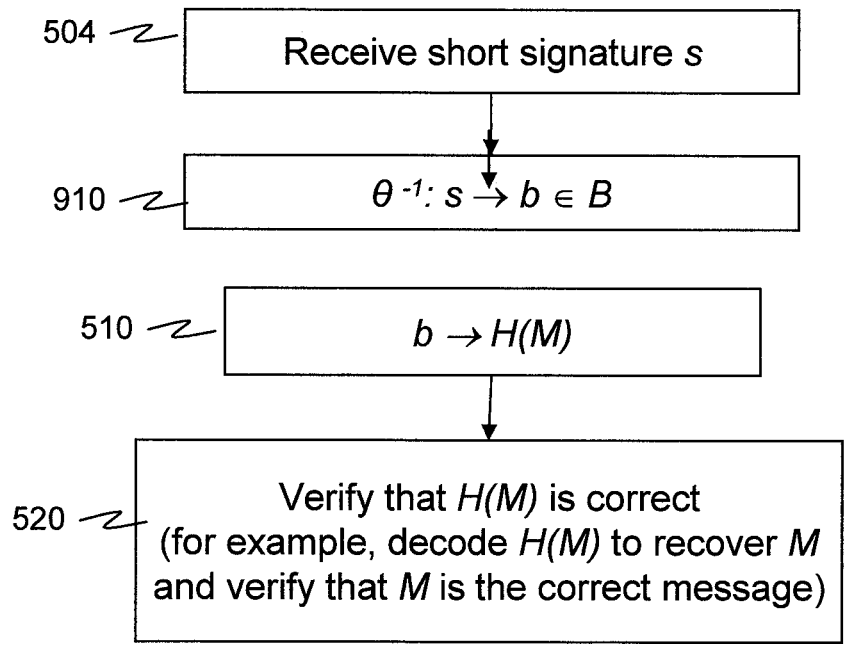
FIG. 9 is a flowchart of a signature verification method according to some embodiments of the present invention.

The above approach to computing f can, of course, be used to create a sequential aggregate signature scheme based on modular squaring that does not use the θ compression function (i.e. with step 810 of FIG. 8 omitted)

8. Ring Signature Scheme

In the bandwidth-reduced ring signature scheme of some embodiments of the present invention, a signer $S_i$ can choose any set of signers $\{S_1, \ldots, S_z\}$ of which $S_i$ is a member, and produce a "ring signature" on a message that will convince a verifier that at least one signer in $\{S_1, \ldots, S_z\}$ signed the message, though the verifier will not be able to determine which one. The signer $S_i$ therefore has limited anonymity within the "ring" of possible signers.

In some embodiments, the signers have public moduli $\{N_1, \ldots, N_z\}$ that the verifier uses to verify the ring signature. The ring signature includes z strings $\{x_1, \ldots, x_z\}$ that collectively satisfy $C_{k,v}\{y_1, \ldots, y_z\} = w$, where $y_i = x_i'^2 \pmod{N_i}$, $x_i' = \theta_{N_j, h, h}(x_i)$, v and w are given bit strings, and C is a "combining function." The bandwidth-reduced ring signature scheme of some embodiments of the present invention achieves shorter ring signatures than in the Rivest-Shamir-Tauman scheme by using the previously described θ quasi-permutation and by using a more bandwidth-efficient way of dealing with the fact that the moduli $N_i$ have different sizes.

Recall that in the Rivest-Shamir-Tauman scheme (Listings 10, 11), for $x_i' = q_i N_i + r_i \in [0, 2^b - 1]$, one computes $y_i = q_i N_i + g_i(r_i)$ if $(q_i+1) N_i \leq 2^b$ and $y_i = x_i'$ otherwise, where $g_i$ denotes the function $g_i(x_i') = x_i'^2 \pmod{N_i}$, and b is a predefined constant. As long as b is sufficiently large, the proportion of $y_i$ for which $(q_i+1)N_i > 2^b$ will be negligible, so that the mapping of x'i to $y_i$ behaves almost indistinguishably from squaring modulo $N_i$. Unfortunately, choosing b to be this large (much larger than the logarithms of all the moduli) is also bandwidth-inefficient. It would be more bandwidth-efficient, for $x_i' = q_i N_i + r_i \in [0, 2^b - 1]$, to compute $$y_i = q_i N_i + g_i(r_i) \pmod{2^b}, \text{ where } b = \max\{\lceil \log_2 N_i \rceil\}. \tag{22}$$

In some embodiments of the present invention, with the θ quasi-permutation, one can do even better, using $b = \max\{\lceil \log_2(h'-h) \rceil\}$ so that b may be about two-thirds of $\max\{\lceil \log_2 N_i \rceil\}$. Then, for a given $x_i$ one may compute $x_i' = \theta_{N_i, 0, 2^b-1}(x_i, r)$ and $y_i = g_i(x_i')$. The combining function could still be:

$$C_{k,v}(y_1, \ldots, y_z) = E_k(y_z \oplus E_k(y_{z-1} \oplus E_k(\ldots \oplus E_k(y_1 \oplus v) \ldots))),$$

where $E_k$ is a symmetric encryption scheme using a key k.

Assuming $S_i$ is the "real" signer, the ring signature in some embodiments of the present invention is generated as follows:

Listing 30—Ring Signature:
1. Compute k=H(M), where M is the message to be signed, and H is a hash function.
2. Pick a random $v \in \{0,1\}^b$.
3. For each j≠i:
   3A. Pick a random $x_j' \in B_j = B_{N_j, 0, 2^b - 1}$. This can be done randomly uniformly, as described in C. Gentry's aforementioned article.
   3B. Compute $y_j = g_j(x_j')$.
4. Compute $y_i$ such that $E_k(y_z \oplus E_k(y_{z-1} \oplus E_k(\ldots \theta D\ E_k(y_1 \oplus v) \ldots))) = v$.
5. Using secret knowledge about $N_i$, compute $x_i'$ such that $y_i = g_i(x_i')$.
6. For all j:
   Compute $x_j = \theta_{N_j, 0, 2^b - 1}(x_j', r)$* See Listing 16. (The r value can be random and can be different for different j.)
7. Output the ring signature $(x_i, \ldots, x_z, v)$.
End of Listing 30.

As before (Listing 11), the ring signer can use the equation $$y_i = E_k^{-1}(y_z \oplus E_k^{-1}(\ldots y_{i-1} \oplus E_k^{-1}(v))) \oplus E_k(y_{i-1} \oplus E_k(\ldots \oplus E_k(y_1 \oplus v))),$$

to compute $y_i$ from the values of the $y_j$'s, j≠i. Some values of $y_j$, in fact about three-quarters of them, do not have modular square roots; in this case, step 5 must be performed again until $y_j$ is a quadratic residue modulo $N_j$.

Listing 31—Ring Signature Verification:
1. Compute k=H(M).
2. For all j, compute $$x_j' = \theta^{-1}_{N_j, 0, 2^b - 1}(x_j, r),$$

$$y_j = g_j(x_j').$$

3. Confirm that $$E_k(y_z \oplus E_k(y_{z-1} \oplus E_k(E_k(y_1 \oplus v) \ldots))) = v.$$

End of Listing 31.

As with other schemes described above, r at step 6B of Listing 30 is a source of extra bits, chosen randomly with each invocation of the quasi-permutation, or in a way that depends deterministically—but unpredictably—on the other input of the quasi-permutation (e.g., $x_j'$). Also, the signers can use different values for h and h'; however, since each signer's values of h and h' are needed for verification of the ring signature (and are therefore, in some sense, part of the public keys), all signers use the same values in some embodiments.

9. Other Schemes and Extensions

The compression and decompression schemes of some embodiments of the present invention are useful in cryptographic contexts other than encryption, signature, aggregate signature, and ring signature. For example, threshold encryption and decryption utilizing the compression and decompression methods of the present invention may be more efficient when the size of a ciphertext is smaller. Also, in other signature schemes (for example, Fiat-Shamir's version, and particularly an identity-based version) and in other identity-based encryption schemes (such as those employing Cocks' encryption scheme), signers can have shorter (identity-based) public keys and secret keys (the latter are B-elements). Additionally, identification schemes based on sending modular squares are likewise improved by application of the instant invention. See A. Fiat and A. Shamir, "How to Prove Yourself Practical Solutions to Identification and Signature Problems," in Proc. Of Crypto 1986, Lecture Notes in Computer Science 263, pp. 186-194. Springer, 1986; U. Feige, A. Fiat, and A. Shamir, "Zero-Knowledge Proofs of Identity," in Jour. Of Cryptology (1), pp. 77-94 (1988); C. Cocks, "An Identity Based Encryption Scheme Based on Quadratic Residues," in Proc. Of Cryptography and Coding 2001, Lecture Notes in Computer Science 2260, Springer (2001); A. Menezes, P. van Oorschot and Scott Vanstone, Handbook of Applied Cryptography, Chapter 10, available at http://www.cacr.math.uwaterloo.ca/hac/. Indeed, the compression and decompression methods of the present invention offer a global bandwidth-efficiency improvement to schemes wherein security is based on computing modular square roots.

It is also possible to achieve bandwidth-reduced schemes without using the Farey interval-based compression and decompression methods. Below, two such embodiments of the present invention are described: an encryption scheme and a signature scheme, both of which enjoy bandwidth reduction that, under some circumstances, is even greater than with the embodiments of the instant invention- that are based on compression and decompression (but potentially at the cost of some other desirable property, such as the possibility of a loss of provable security).

Figure 4:
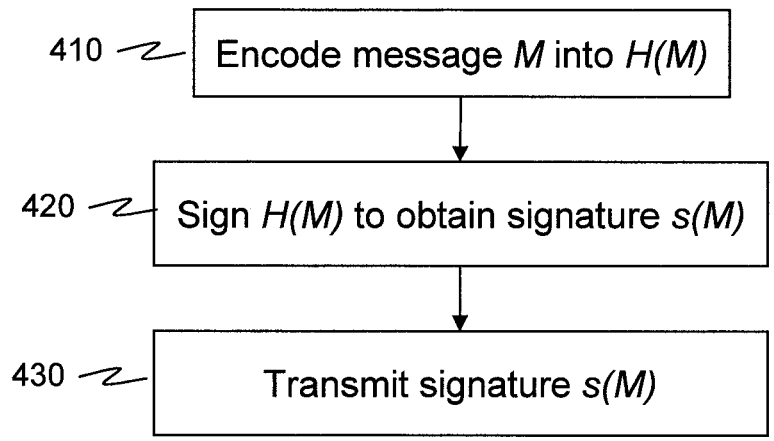
FIG. 4 is a flowchart of a prior art signature method.
Figure 5:
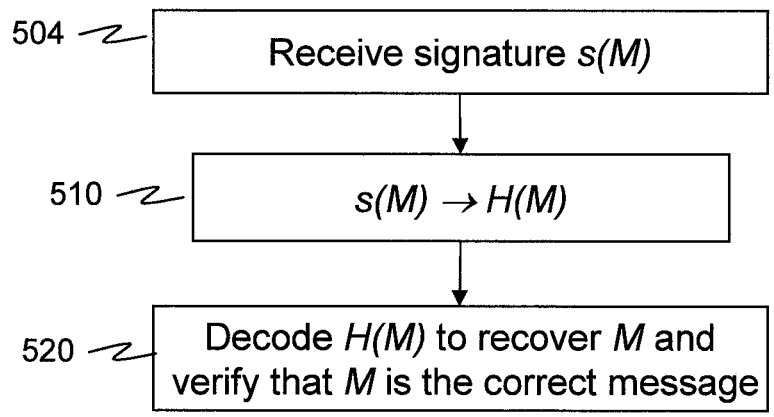
FIG. 5 is a flowchart of a prior art signature verification method.

One can get an (arguably) bandwidth-reduced signature scheme by applying Coppersmith's method to a regular Rabin signature (Listings 7, 8) or a regular low-exponent RSA signature (Listings 3 and 4). See D. J. Bernstein, "Proving Tight Security for Standard Rabin-Williams Signatures." Available at http://cr.yp.to/djb.html; D. Bleichenbacher, "Compressed Rabin Signatures," in Proc. Of CT-RSA 2004, Lecture Notes in Computer Science 2964, pp. 126-128. Springer, 2004; D. Coppersmith, "Finding a Small Root of a Univariate Modular Equation," in Proc. Of Eurocrypt 1996, Lecture Notes in Computer Science, pp. 155-165. Springer-Verlag, 1996. For example, let e be the public exponent of the Rabin or RSA signature scheme with a modulus N, and let x be a regular signature obtained as in Listing 3 or 7. Coppersmith's method allows anyone (without the need for trapdoor information about N) to (among other things) recover $x \in [1, N]$ from $x^2 \pmod N$ and the $$\frac{e-1}{e} \log N$$

most significant bits of x. Thus, for a Rabin signature (e=2), the method of FIG. 4 can be modified as follows:

Listing 32:
1. Step 410: Compute H(M). H may be a full-domain function, i.e. a function whose range is [1,N] (see e.g. Listing 7), or a partial-domain hash function, i.e. a function whose range is a proper subset of [1,N].
2. Step 420: Compute signature x=s(M) such that $x^2$=H(M) (mod N).
3. Step 430: Transmit $\lceil \frac{1}{2}*(\log_2 N) \rceil$ most significant bits of x. Also transmit H(M) or some information sufficient to recover H(M).
End of Listing 32.

The compression achieved by transmitting only the most significant bits of x is somewhat illusory, however, since the information sufficient to recover H(M) must also be transmitted. If H(M) itself must be sent at step 430, then the signature scheme obviously does not possess the desirable message recovery property.

One can get a bandwidth-reduced encryption scheme by using a heuristic method for finding numbers in $B^2_{N,h,h'}$, where h' may be as small as $N^{1/2}$; however, a consequence of using a heuristic drawing method is that the resulting encryption scheme does not enjoy provable security. Heuristically, to use the security proof model of FIG. 10 with the set $S = B^2_{N,h,h'}$, one can generate numbers in $B^2_{N,h,h'}$ for $$h' - h = N^{\frac{1}{2}+\varepsilon_a+\varepsilon_b}$$

as follows:
Listing 33:
1. Choose random $a \in [1, N^{2\varepsilon_a}]$ and $b \in [1, N^{2\varepsilon_b}]$.
2. Compute $x' = \lfloor \sqrt{aN} \rfloor$.
3. Compute x=x'+b.
End of Listing 33.
One can easily show that $$x^2 (\bmod N) = O\left(N^{\frac{1}{2}+\varepsilon_a+\varepsilon_b}\right) \text{ for } \varepsilon_b < \frac{1}{2}.$$

These observations lead to the following encryption scheme:
Listing 34:
1. Encode the message as (a, b), where a is first $2\varepsilon_a \log_2 N$ bits of the message, and b the remaining bits, with $2\varepsilon_a \log_2 N$, $2\varepsilon_b \log_2 N$ rounded down to the nearest integer.
2. Computes x as in Listing 33.
3. Set the ciphertext to be $c = x^2 \pmod N$.
End of Listing 34.
For suitable $\varepsilon_a$, $\varepsilon_b$ with $$\varepsilon_a + \varepsilon_b < \frac{1}{2},$$

one can recover (a, b), and hence the message, as follows:
Listing 35.
1. Compute x as a modular square root of c.
2. Compute $a = \lfloor x^2/N \rfloor$ $b = x - \lceil \sqrt{aN} \rceil$.
End of Listing 35.

One possible disadvantage of this scheme may be that it is perhaps difficult to provide a provable reduction from factoring.

As with many encryption and signature schemes, one can achieve further reduction in bandwidth—about c log log N bits (throughout, the logarithms are base 2 unless noted otherwise) for a small constant c—by increasing the computational complexity of the protocol. For example, one can further decrease the size of the ciphertext by simply not transmitting the final c log log N bits. The decrypter simply must guess those final bits, by re-running the decryption method up to $2^{c \, log \, log \, N} = 2^{log(log \, N)^c} = (log \, N)^c$ times, if necessary. Similarly, the encrypter can run the encryption method an expected $(log N)^c$ times, using different randomness for each tentative encryption, before the tentative ciphertext finally has the final c log log N bits all equal to zero, in which case those bits need not be sent. For signing and verification, similar scenarios apply.

10. Systems and Components

The bandwidth-reduced encryption, signature, signcryption, aggregate signature, and ring signature schemes, and compression and decompression schemes, can be implemented using computer systems 110 and network 120 of FIG. 1. Each system 110 may or may not be a distributed system that includes a number of computer systems interconnected by a network (not shown). Each system 110 may include one or more processors (not shown) programmed to execute computer instructions stored in a computer readable media (not shown), e.g. a semiconductor, magnetic, optical, or some other kind of memory, known or to be invented, for executing the methods of the present invention. In addition, or in the alternative, each system 110 may include hardwired circuitry for performing the methods of the present invention. Network 120 may be the Internet and/or a wireless communications network, and/or any other type of network in which communications of any type are transmitted. Computer instructions implementing the methods of the present invention can be transmitted to or from a system 110 as incorporated in a physical signal (e.g. electromagnetic signal) over cables, radio waves, or other means. The signal may or may not be modulated on a carrier wave.

A computer system 110 may be used as a server certification component ("certifier") enabled to provide a public-key certificate intended to certify the authenticity, ownership or attributes associated with a public key that is used in the encryption, signature, signcryption, aggregate signature, or ring signature embodiments of the present invention. The certifier can send the public key to another system 110. Also, certifier 110 can generate public and private keys for use by an authorized person, and provide them to that person by sending them in a compressed encrypted form to another system 110. Non-certifier systems 110 can send ciphertexts and signatures to each other through the certifier system 110 or directly. The ciphertexts and signatures can also be transferred non-electronically (e.g. by regular mail) on electronic media (e.g. disks).

Additional features obtained in some embodiments are described in the aforementioned article by C. Gentry, *How to Compress Rabin Ciphertexts and Signatures (and More)*.

The invention is not limited to the embodiments described above. For example, the techniques described above, and the security proofs, can be extended to sets $B_{N,h,h'}$ and $B^Z_{N,h,h'}$. Of note, $B_{N,h,h'}$ consists of $B^2_{N,h,h'}$ and the negatives modulo N of the numbers in $B^2_{N,h,h'}$. $B^Z_{N,h,h'}$ excludes the numbers having a common divisor with N other than 1, but the set of such numbers is very small if N is the product of two primes. Some embodiments use the sets $B_{N,Q}$, $B^2_{N,Q}$, $B^Z_{N,Q}$ where Q is other than [h,h']. In particular, Q can be [h,h'), (h,h'], or (h,h'). Also, $B^2_{N,Q}$ can be defined as not including x=0, i.e. as $\{x \in [1,N): x^2 (\bmod \, N) \in Q\}$. The invention is not limited to the methods for which the security proofs are valid. Above, bit strings were associated with numbers such that for a bit string $x = x_0 x_1 \ldots x_{n-1}$, the corresponding number is $x_0 + x_1 * 2 + \ldots + x_{n-1} * 2^{n-1}$; however, other numerical representations can also be used. Other embodiments and variations are within the scope of the invention, as defined by the appended claims.

What is claimed is:

1. A method comprising performing a cryptographic operation by an apparatus comprising:
   one or more computer processors programmed to execute the cryptographic operation by executing computer instructions stored in a computer readable medium; and/or
   hardwired circuitry for executing the cryptographic operation;
   wherein performing the cryptographic operation comprises performing, by executing the computer instructions and/or by the hardwired circuitry, operations of:
   obtaining a first message representable as an integer modulo a predetermined composite modulus N, the first message being in a first sub-range of a set $Z_N$ of all the integers modulo N, wherein a length of the first sub-range is less than N;
   submitting the first message as an input to a process which determines, from each input which is an integer in the first sub-range, a corresponding output in a set of messages whose squares modulo N are in a second sub-range of the set $Z_N$ of all the integers modulo N, wherein a length of the second sub-range is less than N, wherein determining the corresponding output comprises:
   (1) associating the input to an interval ("second-message interval") in a predetermined finite set of Farey intervals or Farey extended partition intervals; and
   (2) selecting the corresponding output to be an integer in the second-message interval;
   wherein the method further comprises:
   performing said process on the first message as the input, to obtain a second message as the corresponding output;
   squaring the second message modulo N;
   wherein the composite modulus N has a secret factorization to provide security to the cryptographic operation, the cryptographic operation's security depending on hardness of computing square roots modulo N.

2. The method of claim 1 wherein the modulus is a product of two prime numbers.

3. A non-transitory computer-readable medium comprising one or more computer instructions operable to cause one or more computer processors to perform the method of claim 2.

4. An apparatus for performing the method of claim 2, the apparatus comprising:
   one or more computer processors programmed to execute the cryptographic operation by executing computer instructions stored in a computer readable medium; and/or
   hardwired circuitry for executing the cryptographic operation.

5. The method of claim 1 wherein in the first sub-range, each number has a length less than or equal to the length of a number h", wherein the number h" is a positive number less than N.

6. An apparatus for performing the method of claim 5, the apparatus comprising:
one or more computer processors programmed to execute the cryptographic operation by executing computer instructions stored in a computer readable medium; and/or
hardwired circuitry for executing the cryptographic operation.

7. A non-transitory computer readable medium comprising one or more computer instructions operable to cause one or more computer processors to perform the method of claim 5.

8. The method of claim 1 wherein the second sub-range is one of (h,h'), [h,h'), (h,h'], [h,h'] where h and h' are predetermined numbers, and the Farey intervals or the Farey partition intervals are for an interval [0,N/2) of an order $$k = \frac{2N}{h' - h}$$

rounded to an integer.

9. The method of claim 8 wherein $h'-h<8N^{2/3}+1$.

10. The method of claim 9 wherein in the first sub-range, each number has a length less than or equal to the length of the number $$\frac{2(h' - h)}{5}$$

rounded to an integer.

11. An apparatus for performing the method of claim 10, the apparatus comprising:
one or more computer processors programmed to execute the cryptographic operation by executing computer instructions stored in a computer readable medium; and/or
hardwired circuitry for executing the cryptographic operation.

12. A non-transitory computer readable medium comprising one or more computer instructions operable to cause one or more computer processors to perform the method of claim 10.

13. An apparatus for performing the method of claim 9, the apparatus comprising:
one or more computer processors programmed to execute the cryptographic operation by executing computer instructions stored in a computer readable medium; and/or
hardwired circuitry for executing the cryptographic operation.

14. An apparatus for performing the method of claim 8, the apparatus comprising:
one or more computer processors programmed to execute the cryptographic operation by executing computer instructions stored in a computer readable medium; and/or
hardwired circuitry for executing the cryptographic operation.

15. The method of claim 1 wherein squaring the second message modulo N is performed as part of encrypting the first message or a message encoded into the first message.

16. An apparatus for performing the method of claim 15, the apparatus comprising:
one or more computer processors programmed to execute the cryptographic operation by executing computer instructions stored in a computer readable medium; and/or
hardwired circuitry for executing the cryptographic operation.

17. A non-transitory computer readable medium comprising one or more computer instructions operable to cause one or more computer processors to perform the method of claim 15.

18. The method of claim 1 wherein the first message represents a signature or a signature encoding, and squaring the second message modulo N is performed as part of verifying the signature.

19. An apparatus for performing the method of claim 18, the apparatus comprising:
one or more computer processors programmed to execute the cryptographic operation by executing computer instructions stored in a computer readable medium; and/or
hardwired circuitry for executing the cryptographic operation.

20. A non-transitory computer readable medium comprising one or more computer instructions operable to cause one or more computer processors to perform the method of claim 18.

21. An apparatus for performing the method of claim 1, the apparatus comprising:
one or more computer processors programmed to execute the cryptographic operation by executing computer instructions stored in a computer readable medium; and/or
hardwired circuitry for executing the cryptographic operation.

22. A non-transitory computer readable medium comprising one or more computer instructions operable to cause one or more computer processors to perform the method of claim 1.

23. A method comprising performing a cryptographic operation involving a first message, a second message, and a third message which are representable as integers modulo a predetermined composite modulus N, wherein the cryptographic operation involves a first sub-range and a second sub-range which are sub-ranges of the set $Z_N$ of all the integers modulo N, wherein the cryptographic operation is performed by an apparatus comprising:
one or more computer processors programmed to execute the cryptographic operation by executing computer instructions stored in a computer readable medium; and/or
hardwired circuitry for executing the cryptographic operation;
wherein performing the cryptographic operation comprises performing, by executing the computer instructions and/or by the hardwired circuitry, operations of:
computing a square root of the third message modulo N to obtain the second message, wherein the third message is in the second sub-range, wherein a length of the second sub-range is less than N;
submitting the second message as an input to a process which determines, from each input which is an integer whose square modulo N is in the second sub-range, a corresponding output in the first sub-range, wherein a length of the first sub-range is less than N, wherein determining the corresponding output comprises:

(1) associating the input to an interval ("second-message interval") in a predetermined finite set of Farey intervals or Farey extended partition intervals;
(2) determining an interval (first-message interval) which corresponds to the second-message interval; and
(3) selecting the corresponding output to be an integer in the first-message interval;
wherein the method further comprises performing said process on the second message as the input, to obtain the first message as the corresponding output;
where the composite modulus N has a secret factorization to provide security to the cryptographic operation, the cryptographic operation's security depending on hardness of computing square roots modulo N.

24. The method of claim 23 wherein the modulus is a product of two prime numbers.

25. An apparatus for performing the method of claim 24, the apparatus comprising:
one or more computer processors programmed to execute the cryptographic operation by executing computer instructions stored in a computer readable medium; and/or
hardwired circuitry for executing the cryptographic operation.

26. The method of claim 23 wherein in the first sub-range, each number has a length less than or equal to a length of a number h", wherein the number h" is a positive number less than N.

27. An apparatus for performing the method of claim 26, the apparatus comprising:
one or more computer processors programmed to execute the cryptographic operation by executing computer instructions stored in a computer readable medium; and/or
hardwired circuitry for executing the cryptographic operation.

28. The method of claim 23 wherein the second sub-range is one of (h,h'), [h,h'), (h,h'], [h,h'] where h and h' are predetermined numbers, and the Farey intervals or the Farey partition intervals are for an interval [0,N/2] of an order $$k = \frac{2N}{h' - h}$$

rounded to an integer.

29. The method of claim 28 wherein $h'-h<8N^{2/3}+1$.

30. The method of claim 29 wherein in the first sub-range, each message is a number whose length is less than or equal to a length of the number $$\frac{2(h' - h)}{5}$$

rounded to an integer.

31. An apparatus for performing the method of claim 30, the apparatus comprising:
one or more computer processors programmed to execute the cryptographic operation by executing computer instructions stored in a computer readable medium; and/or
hardwired circuitry for executing the cryptographic operation.

32. An apparatus for performing the method of claim 29, the apparatus comprising:
one or more computer processors programmed to execute the cryptographic operation by executing computer instructions stored in a computer readable medium; and/or
hardwired circuitry for executing the cryptographic operation.

33. A non-transitory computer readable medium comprising one or more computer instructions operable to cause one or more computer processors to perform the method of claim 29.

34. An apparatus for performing the method of claim 28, the apparatus comprising:
one or more computer processors programmed to execute the cryptographic operation by executing computer instructions stored in a computer readable medium; and/or
hardwired circuitry for executing the cryptographic operation.

35. The method of claim 23 wherein the third message is a ciphertext corresponding to the first message or to a message encoded into the first message.

36. An apparatus for performing the method of claim 35, the apparatus comprising:
one or more computer processors programmed to execute the cryptographic operation by executing computer instructions stored in a computer readable medium; and/or
hardwired circuitry for executing the cryptographic operation.

37. A non-transitory computer readable medium comprising one or more computer instructions operable to cause one or more computer processors to perform the method of claim 35.

38. The method of claim 23 wherein the first message is a signature corresponding to the third message or a message encoded into the third message.

39. An apparatus for performing the method of claim 38, the apparatus comprising:
one or more computer processors programmed to execute the cryptographic operation by executing computer instructions stored in a computer readable medium; and/or
hardwired circuitry for executing the cryptographic operation.

40. A non-transitory computer readable medium comprising one or more computer instructions operable to cause one or more computer processors to perform the method of claim 38.

41. An apparatus for performing the method of claim 23, the apparatus comprising:
one or more computer processors programmed to execute the cryptographic operation by executing computer instructions stored in a computer readable medium; and/or
hardwired circuitry for executing the cryptographic operation.

42. A non-transitory computer readable medium comprising one or more computer instructions operable to cause one or more computer processors to perform the method of claim 23.

* * * * *